United States Patent [19]

Willis et al.

[11] Patent Number: 4,745,559

[45] Date of Patent: May 17, 1988

[54] METHOD AND SYSTEM FOR DYNAMICALLY CONTROLLING THE CONTENT OF A LOCAL RECEIVER DATA BASE FROM A TRANSMITTED DATA BASE IN AN INFORMATION RETRIEVAL COMMUNICATION NETWORK

[75] Inventors: Richard A. Willis, West Clandon; Alan Markham, Radlett, both of United Kingdom; Robert S. Genshaft, Plainview, N.Y.

[73] Assignee: Reuters Limited, London, England

[21] Appl. No.: 813,703

[22] Filed: Dec. 27, 1985

[51] Int. Cl.⁴ .................. G06K 15/00; G06F 15/20
[52] U.S. Cl. .................. 364/514; 364/408; 370/91
[58] Field of Search .............. 364/400, 401, 408, 514, 364/200, 900, 517; 370/91, 92

[56] References Cited

U.S. PATENT DOCUMENTS 4,260,854  4/1981  Kolodny et al. ............... 364/514
4,633,397 12/1986  Macco ............................ 364/401

FOREIGN PATENT DOCUMENTS 59-89056   5/1984  Japan ............................ 364/514
60-144050  7/1985  Japan ............................ 364/514

Primary Examiner—Parshotam S. Lall
Assistant Examiner—Brian M. Mattson
Attorney, Agent, or Firm—Stiefel, Gross & Kurland

[57] ABSTRACT

A method and system (28) are provided for dynamically controlling the content of a local receiver data base (24, 26) from a transmitter data base (20) in an information retrieval communication network (28) in which a message transmitter transmitting the transmitter data base (20) dynamically provides data base messages over a message distribution network (22) to local receivers receiving the local receiver data bases (24, 26). The transmitter data base (20) messages are used to incrementally increase and decrease the content of the local receiver data base (24, 26) on a record-by-record basis. In addition, non-data base messages may also be provided. The data base messages consist of displayable data as well as file maintenance messages. Storage templates (42) are retrievably stored at the local receiver data base (24, 26). These storage templates (42) are locally retrieved based on receipt of a unique identifier. Each stored record (40) has a unique associated storage template (42) although a storage template (42) may be corresponding to several different records (40). Set identifiers defining multiple field identifiers of information fields and ripple chains, which chains require a change in only one field in the ripple chain to be transmitted, are used by the local receiver data base (24, 26) in conjunction with transmitted update record data base messages (54) to reduce the communications capacity that is required.

60 Claims, 12 Drawing Sheets

METHOD AND SYSTEM FOR DYNAMICALLY CONTROLLING THE CONTENT OF A LOCAL RECEIVER DATA BASE FROM A TRANSMITTED DATA BASE IN AN INFORMATION RETRIEVAL COMMUNICATION NETWORK

TECHNICAL FIELD

The present invention relates to methods and systems for dynamically controlling the content of a local receiver data base from a transmitted data base in an information retrieval communication network, such as an information retrieval system capable of supporting the transfer of data on a high performance, real-time retrieval basis in which update rates, retrieval rates and subscriber population are high. The method and system of the present invention enables incremental increase and decrease of a local receiver data base on a record by record basis and employs independent records which consist of multiple sets of information fields, with the local receiver data base being a subset of the transmitter data base. Storage templates are employed at the local receiver data base to locally decipher the data base messages distributed from the transmitted data base on a record by record basis.

BACKGROUND ART

High performance, real-time retrieval networks are well known in the art such as the REUTERS MONITOR system employed for transmitting financial transaction information, such as stock market information, to brokers, banks and other subscribers. Such systems normally require high update rates as well as high retrieval rates in order to provide the most accurate and up-to-date information possible in the dynamic, high volume environment of the financial information market. In such an environment any delay can result in substantial economic losses due to, for example, trades or other business decisions being made on information which is not the latest up to date information. Because of the high volume of financial instruments involved in today's trading and financial information environment as well as the frequency of changes in prices and the large number of information categories which professional traders and financial planners use in order to evaluate what action to take in connection with a given financial transaction, the speed and accuracy of the information retrieval system or network has become more and more important and rates which only a few years ago were deemed adequate are no longer sufficient. Because of inherent limitations in bandwidth and transmission times, more and more focus has centered on methods to increase bandwidth efficiency so that more information can be transmitted in less time. In addition, in today's trading and financial information environment, many customers maintain their own unique local data bases which are unique subsets of the data base being transmitted by the financial information supplier. For example, in the case of an information supplier such as Reuters, which supplies worldwide information relating to a vast number of financial instruments, a local user or subscriber, such as a bank, may not be interested in the entire Reuters data base. Thus, in such an instance, the local user normally creates its own unique local data base from the pool of available transmitted information. Consequently, the initial construction of the local data base at the user or subscriber receiving end in an efficient manner is an important consideration. In the past, such a data base was constructed by a transmission of a complete data base, with the contents thereof being modified and such a data base was not incrementally constructed on a data base record by record basis. Moreover, although templates per se have been used at a local receiver to match information by a comparison technique, such as disclosed in U.S. Pat. Nos. 4,530,095; 4,507,750; 4,504,735; 4,499,499; 4,488,005; 4,468,204; 4,463,386; 4,388,495; 4,383,135; and 4,336,810, none of these prior art systems known to applicants employs a storage template which actually defines the characteristics of the record structure of each of the integral records being transmitted to and stored in the local receiver data base so as to allow for the interpretation of individual information fields within a given integral record in which each data base message is a self contained entity and does not require knowledge of what came before or after the received data base message in order to decipher or decode the current received data base message. Moreover, applicants are not aware of any prior art systems or methods employing storage templates which contain ripple fields defined in the storage template which enable the chaining together of multiple information fields so as to enable the update of all of the chained information fields merely by transmitting an update message containing an update for only one of the information fields in the ripple chain. Such an arrangement enhances bandwidth efficiency. In addition, applicants are not aware of any prior art systems or methods employing transmitted set identifiers which define multiple information fields in the integral record so as to minimize the number of field identifiers for the information which must be transmitted thereby also enhancing bandwidth efficiency. Thus, the use of storage templates, ripple fields and set identifiers in the system and method of the present invention in a high-speed information retrieval network in which high speed updates are employed, such as in a financial information environment, provides a more efficient data delivery system than previously known to applicants.

DISCLOSURE OF THE INVENTION

The present invention relates to a method and system for dynamically controlling the content of a local receiver data base from a transmitter data base in an information retrieval communication network in which a message transmitter associated with the transmitter data base dynamically provides data base messages over a message distribution network to a message receiver associated with the local receiver data base. A plurality of the data base messages are distributed to the message receiver from the transmitter data base as self contained integral records which are locally deciphered at the message receiver for controlling the local receiver data base content through the use of storage templates. The storage templates are locally retrievably stored in the local receiver data base with each of the storage template defining a different unique logical data structure for the distributed self contained integral records, at least one of the storage templates being associated with a plurality of the distributed self contained integral records.

Each of the plurality of distributed data base messages comprises a storage template identifier associated with a given one of the storage templates, which associated storage template is locally retrieved at the local receiver data base based on the storage template identifier content of the distributed self contained integral record. The distributed self contained integral record is processed at the message receiver or subscriber end for controlling the local receiver data base content based on the locally retrieved associated storage template. Such processing may include adding a distributed self contained integral record to the local receiver data base as a stored record for incrementally increasing the stored record content of the local receiver data base or deleting a stored self contained integral record to incrementally decrease the stored record content of the local receiver data base. The integral record preferably includes a plurality of information fields, and update messages are sent as distributed data base messages to update selected ones of these information fields.

The update messages comprise unique record identifiers associated with a given locally stored distributed self contained integral record, with the update message being locally deciphered based on the retrieved storage template associated with that update message. The update message also comprises a field identifier associated with each of the information fields to be updated in the associated integral record and may include a set identifier which corresponds to a plurality of different information fields in the record with each of the different information fields corresponding to a different information category so that the locally stored distributed self contained integral record may have a plurality of different information fields updated based on a single update message.

In addition, the storage template may include a ripple field which chains together a plurality of information fields in a record so as to enable updating of each of the plurality of chained information fields in the ripple field by transmission of an update message containing update information for only one of the ripple fields in the chain. Where the distributed messages relate to financial information such as stock market information, for example, the ripple fields may relate to chronologically changing stock market information with the plurality of chained information ripple fields being chronologically related and corresponding to a common information category, such as the last five trade prices for a stock. In the system or method of the present invention, the local receiver data base preferably comprises a subset of the transmitter data base which is defined by the transmitted data base messages, with the system including a plurality of subscribers or receivers connected to a common transmitter data base so that the individual subscribers or users may create unique subsets of the transmitted data base as their associated local receiver data base.

By employing the system and method of the present invention an efficient data delivery system, both from a bandwidth and operational point of view, is provided, particularly for use with a high speed information retrieval network having a high volume of updates, such as a financial information retrieval network.

BEST MODE FOR CARRYING OUT THE INVENTION

For purposes of illustration, the presently preferred method and system of the present invention shall be described in terms of an information retrieval system for financial information, such as stock market type information and money market information, since such a system normally employs a transfer of data in a high performance, real-time information retrieval network in which update rates, retrieval rates and subscriber or user population are generally very high, and in which the efficiencies of the present invention as a data delivery system both from a bandwidth and an operational point of view can readily be appreciated.

Figure 1:
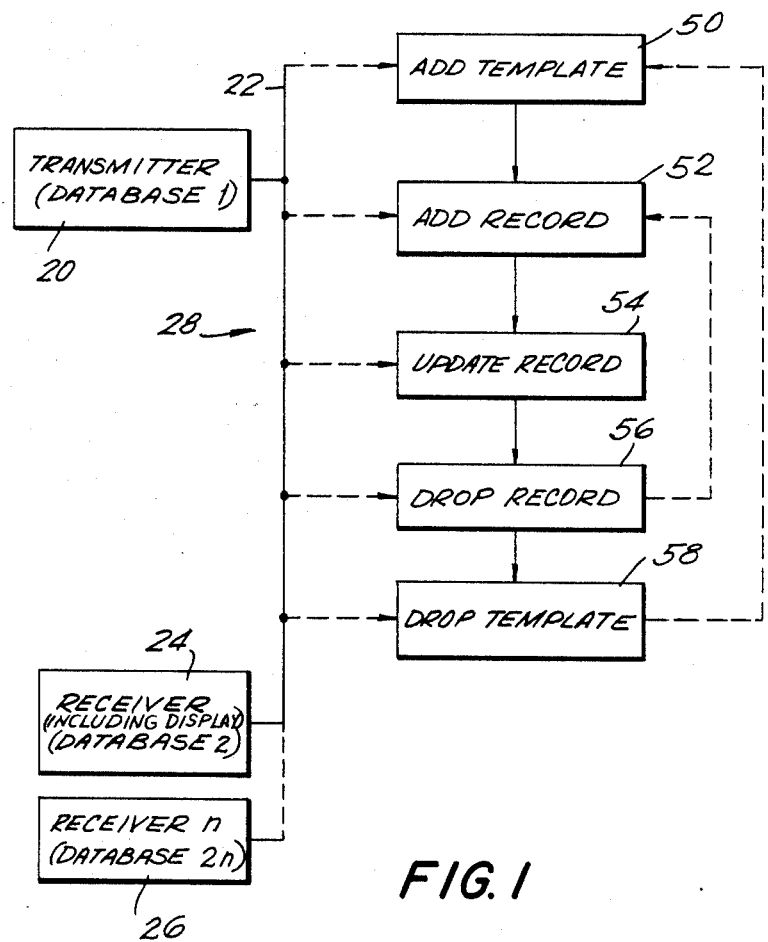
FIG. 1 is logic flow diagram illustrative of the presently preferred method and system of the present invention illustrating the normal message flow from the transmitted data base to a local receiver data base.

Referring now to the drawings in detail, and initially to FIG. 1 thereof, the normal types of message flow is from data base 1, which is the terminology used herein for the transmitter data base which is stored in a conventional data base storage means at the transmitter 20, such as a conventional main frame computer of the type available from Digital Equipment Corporation under the designation VAX with its associated conventional data base storage device and other equipment conventionally employed to transmit data base and non-data base messages, over a conventioanl message distribution or information retrieval communication network, 22, such as one employing conventional telephone lines, satellite transmission, microwave transmission or any other type of conventional communication network for retrievable computer information, to a plurality of subscriber or receivers for the transmitted messages having local associated data bases or data bases 2-2n, with one such typical conventional receiver and local data base being illustrated in FIG. 1 and given reference numeral 24 and another such typical receiver and local data base being illustrated in FIG. 1 and given reference numeral 26. In the example of the use of a Digital Equipment Corporation VAX as a transmitter 20, the conventional receivers 24 and 26 may preferably be conventional microcomputers available from Digital Equipment Corporation under the designation MICROVAX having the conventional associated local data base storage means and message receiving equipment. In the above example, where a Digital Equipment Corporation MICROVAX is employed at the receivers 24 or 26, the microcomputer is preferably programmed in PASCAL, although any other conventional computer language useable with the selected microcomputer and information retrieval network may of course be employed without departing from the spirit and scope of the present invention.

As referred to above, and as will be described in greater detail hereinafter, the presently preferred dynamic data base control system 28 of the present invention shall be described in terms of a system or information retrieval communication network for financial information, such as stock market type information. In this regard, the system 28 of the present invention preferably moves logical data from the transmitter data base 20 to the local receiver data base 24 or 26 in the above example in an efficient manner in which the content of the local receiver data base, for example data base 2 at receiver 24, may be dynamically controlled from the transmitter data base 20, referred to as data base 1. The presently preferred method and system 28 of the present invention, as will be described in greater detail hereinafter, supports the transfer of data on a high performance, real-time retrieval network basis in which update rates, retrieval rates, and subscriber or receiver population can be quite high. In doing this, a number of different types of messages are preferably transmitted from transmitter 20 to the plurality of receivers 24 and 26 through the message distribution network 22 with these messages broadly being classified into those which relate to data base items and those which relate to non-data base items.

Data base messages are preferably messages that relate directly to data that is held on the system data base, which in this instance is data base 1, and covers all data types which are retrievably stored in the data base, either data base 1 or data base 2 in the example in FIG. 1, with the stored data base messages being referred to as records, and with each record preferably being comprised of a number of uniquely identifiable fields, as will be described in greater detail hereinafter. Thus, all data base items are preferably stored as records comprising multiple information fields which, in the example of a financial information retrieval network may include displayable pages, quotes, subscriber permission information, etc., such as employed in REUTERS MONITOR, and the receiver 24 or 26 may also include a conventional display terminal such as used in the REUTERS MONITOR system. With respect to the aforementioned non-data base messages, these messages are data type messages which are not stored in a data base and are transient to the information retrieval network 28, such as what are termed directed messages, which are messages addressed to a given subscriber station or set of subscriber stations, or news alerts which are not stored but rather are instantaneously flashed on the screen. The aforementioned logical data format employed in the presently preferred system of the present invention relates to the fact that the transmitted data can be processed in a way independent of the actual format of the data as transmitted throught the message distribution network 22.

Figure 7:
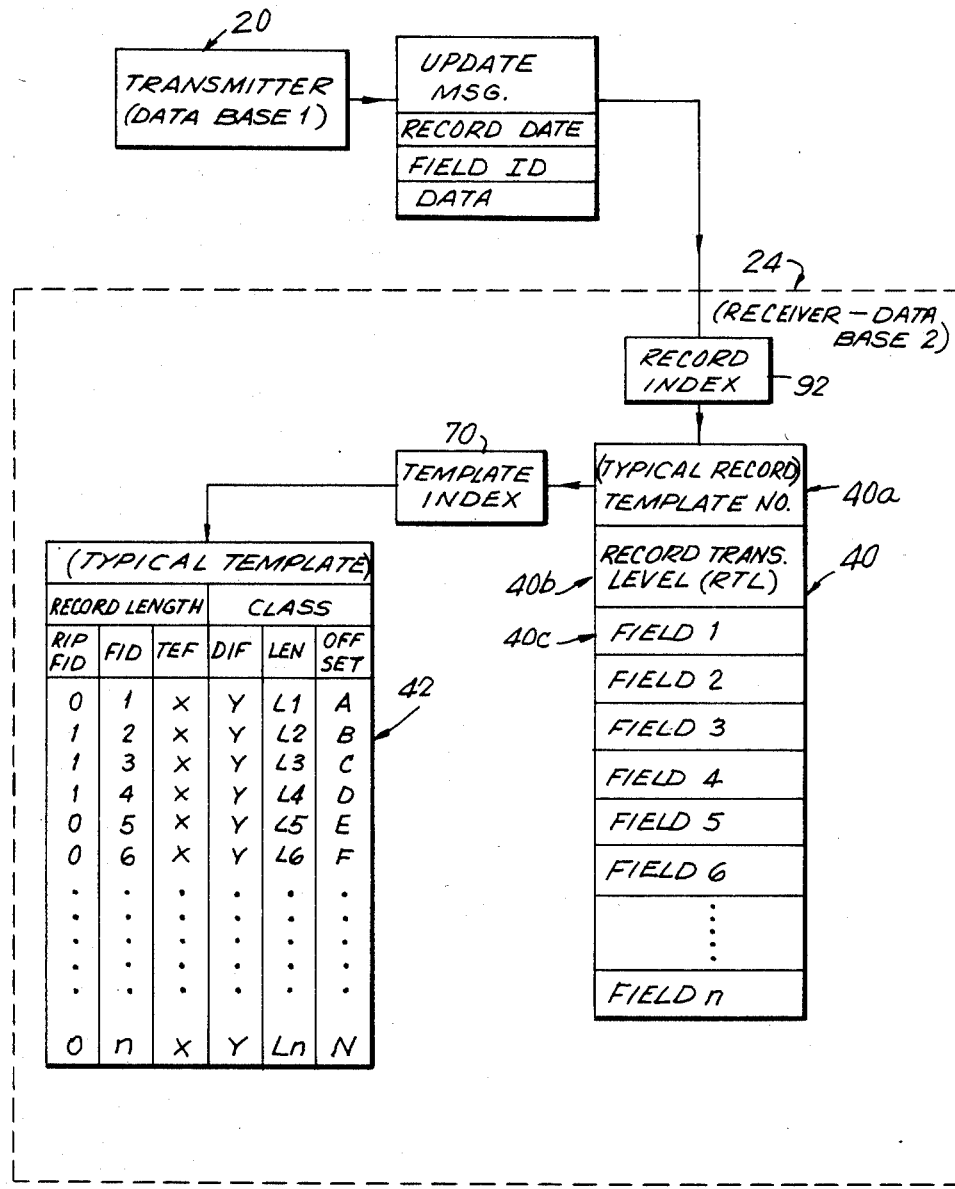
FIG. 7 is a diagrammatic illustration of the presently preferred method and system of FIG. 1 illustrating the use of a storage template in the method and system of the present invention.

In the presently preferred system and method of the present invention, the local receiver data base, or data base 2, is preferably defined by the data base messages transmitted from the transmitter data base, or data base 1, over the message distribution network 22 and may result in the creation of different local receiver data bases at different receivers so that, for example, local receiver data base 2 at receiver 24 may be different in content from local receiver data base 2n at receiver 26. As will be described in greater detail hereinafter, the data base messages transmitted from data base 1 at transmitter 20 not only define what records will exist in the local receiver data base 24, such as data base 2, but define the contents of these records. Preferably, the local receiver data base 24, or data base 2, consists primarily of a set of independent self contained integral records with each record, as previously mentioned, consisting of a set of fields which, in the instance of a financial information retrieval network, are information fields which are related to financial or stock market or financial instrument information, with each of the fields comprising an individual item of data which comprises a record, each of which is uniquely identifiable. Each record transmitted or stored in the system 28 of the present invention preferably has a unique record identification code or RIC, with a typical such record being illustrated in FIG. 7 by reference numeral 40. FIG. 7, which will be described in greater detail hereinafter, illustrates the user or subscriber storage templates in the presently preferred system 28 and method of the present invention, with the storage template defining the logical structure of the stored record 40, as will be described in greater detail hereinafter with reference to FIG. 7. Thus, each storage template, such as illustrated by reference numeral 42 in FIG. 7, is a table of information which is stored in the local receiver data base 24 and allows for the deciphering or interpretation of individual fields within a given record 40 and the complete processing of the received data base message from the transmitter data base 20. In this regard, the storage templates 42 are employed not only in the initial construction of a local receiver data base 24, but in the dynamic maintenance of that local receiver data base 24 in enabling incremental increases and decreases in the local receiver data base 24 on a record-by-record basis, as will be described in greater detail hereinafter.

Figure 9:
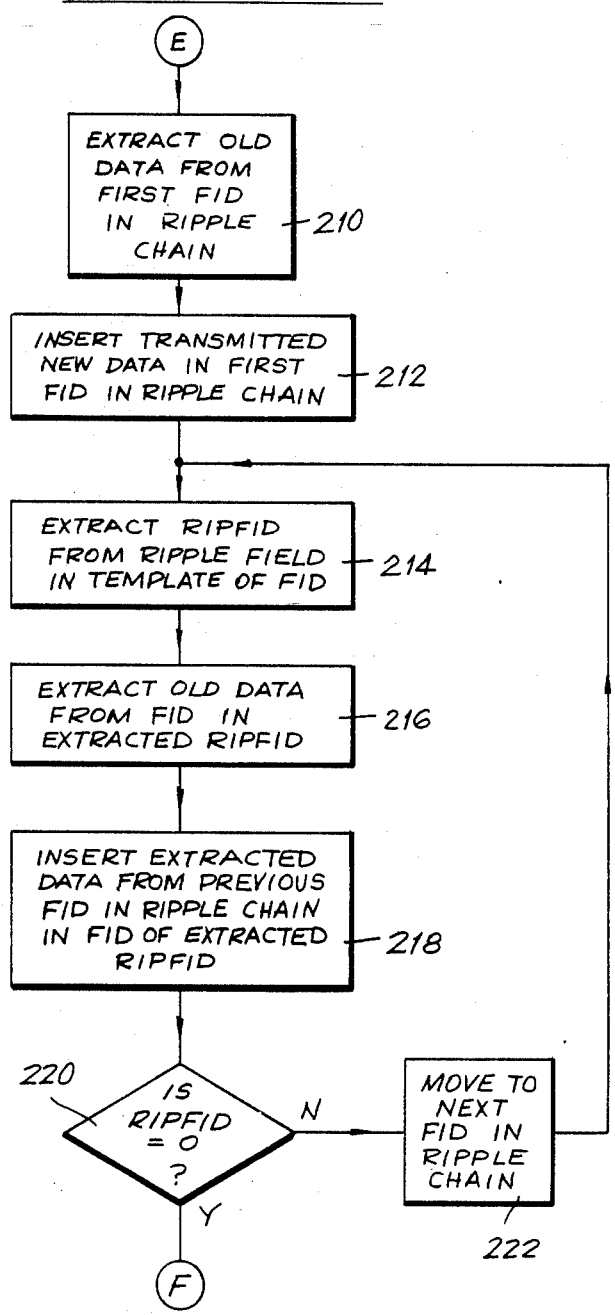
FIG. 9 is a logic flow diagram of the presently preferred method and system of FIG. 1 illustrating the processing of a ripple field in the method and system of the present invention.
Figure 10:
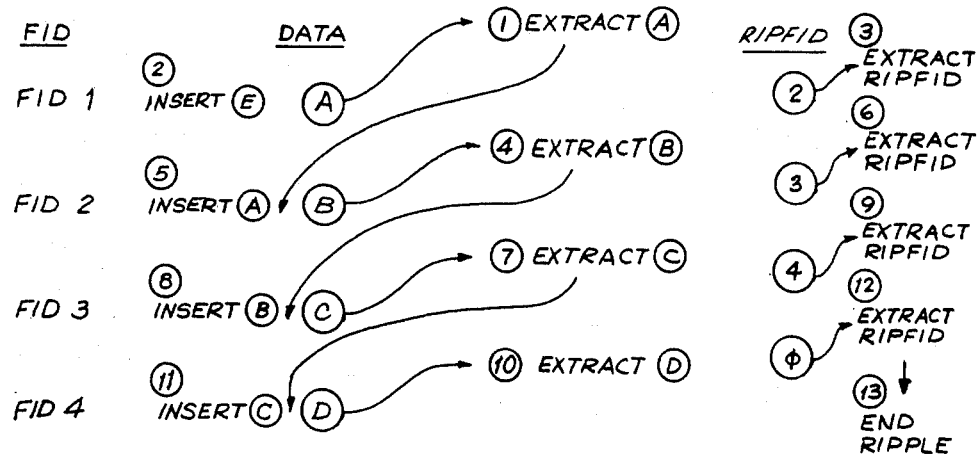
FIG. 10 is a diagramatic illustration of the ripple processing of FIG. 9.

Referring once again to FIG. 1, data base messages from the transmitter data base 20 which deal with the entire record as an entity are illustrated and will be separately described in greater detail hereinafter. These data base messages by way of example, are ADD TEMPLATE, represented by reference numeral 50 in FIG. 1, ADD RECORD, represented by reference numeral 52 in FIG. 1, UPDATE RECORD, represented by reference numeral 54 in FIG. 1, DROP RECORD, represented by reference numeral 56 in FIG. 1 and DROP TEMPLATE represented by reference numeral 58 in FIG. 1. The updating of a record, which will be described in greater detail hereinafter with reference to FIGS. 6A and 6B, by way of example, relates to the updating of the information content contained in selected information fields of the self contained integral record 40 stored at the local receiver data base 24 based on an update data base message transmitted from the transmitter data base 20 to the local receiver data base 24. As will be described in greater detail hereinafter, various preferred methods are employed to accomplish the updating of a record with optimal bandwidth efficiency, such as through the use of ripple field and field set identifiers or SID. Ripple fields, as will be described in greater detail hereinafter with reference to FIGS. 9 and 10 are preferably contained in the storage template 42, and are represented by a ripple chain designated under the designation RIPFID. The ripple chain RIPFID chains together a plurality of information ripple fields in a record so that for each ripple field in the ripple chain there is a pointer to another ripple field, thereby enabling a single information ripple field to be transmitted in an update message which will cause a change in a plurality of information ripple fields in a stored record thereby increasing bandwidth efficiency. Preferably, ripple fields are used for list information which chronologically changes with time, such as, for example, the last five trade prices of a stock, and may be used to provide changing historical data over a series of times, with the information being shifted in each of the reported transaction periods or ripple fields as the update information for the most current transaction period or ripple field is received. Thus, in the instance of the ripple chain relating to the last trade price, all that the local receiver data base 24 would get sent would be the last or most current trade price, with the associated storage template 42 containing information to cause the various ripple fields in the ripple chain of last trade prices to occur based on the stored ripple chain.

As for the bandwidth efficiency, to be described in greater detail hereinafter, resulting from the use of set identifiers, a field set identifier carried in a data base message in the system 28 of the present invention uniquely identifies a set or plurality of data fields in a given record, with the local receiver data base 24 knowing the definition of the set so that a single transmitted field set identifier or SID may be interpreted at the local receiver data base 24 as containing information for a plurality of fields or FIDs, thereby permitting bandwidth compression or efficiency since only a single field set identifier need be transmitted in the data base message as opposed to transmitting a field identifier or FID for each information field to be changed. Of course, the data base messages can consist of a combination of set identifiers and field identifiers in a single message. Generally the set identifiers are based on a recognized pattern affecting a plurality of information fields and is set up at the transmitter data base 20. Thus, set identifiers or SIDs are preferably used where two or more things occur together such as, for example, in the instance of stock market or financial transaction quotation information, where various information fields are changed together.

Before understanding the presently preferred method and system of the present invention, one should understand the presently preferred makeup of a typical record 40 employed in the system 28 and method of the present invention. Each record 40 preferably includes a record header as well as a plurality of information fields. The typical record header (FIG. 7) preferably contains a template number 40a which is the identifier which corresponds to the storage template 42 uniquely associated with record 40 and may preferably contain a record transaction level number 40b which indicates how many times an update or correction has been received for that record 40. By way of example, the template number 40b may be an 8 bit number indicating the storage template 42 associated with the record with, by way of example the total record header size being 3 bytes. One of the data fields 40c in a typical record 40 may be a permission field, if desired. As was previously mentioned, each record 40 stored in the local receiver data base 24 and transmitted from the transmitter data base 20 may preferably comprise a number fields uniquely identified via a field identification code or FIC, with the aforementioned field set identifier or SID defining a plurality of such field identification codes. Preferably each data field within a given data base message transmitted from the transmitter data base 20 will be preceded by a field identification code or, as will be described in greater detail hereinafter, a field set identifier or FID where appropriate, with the field identification code or FIC preferably being in the range of 0 to 32,767 by way of example, which identifies one or a set of unique fields. Preferably, the field identification code or FIC can be either an 8 bit or a 16 bit number, with the first significant bit of each number preferably indicating the length of the remaining code and its use. Preferably, FICs of 16 bits are considered as a size extension bit and a remaining 15 bit number used to identify uniquely each field in a record, with these 15 bit codes, by way of example, taking the range 1 to 32,767 and being termed field identifiers or FIDs. FICs of 8 bits are preferably considered as a size extension bit and a 7 bit number used to identify sets of fields with the 7 bit codes taking the range of 1 to 127, by way of example, and being known as the aforementioned field set identifiers or SIDs. As previously mentioned, field sets have been defined in order to save bandwidth in situations where a change to several fields occurs simultaneously so that these fields can be associated, such as the type of changes which normally occur in a high speed information retrieval network employing financial transaction information. For example, such a situation would occur where a single market activity or event would cause a message to be issued causing modifications to a particular set of field set identifier or SID would be issued with the update message indicating an ordered set of information fields in the stored record 40 to which the various changes would be applied. Another example is a situation in which several fields must be modified to the same extent in which instance both the multiple field identifiers or FIDs and the multiple field of values would be saved or stored merely by transmitting a single field set identifier or SID followed by a single field of value which would be applied to all fields within the set of the stored record 40. It should be noted that the concept of field sets and field set identifiers is applicable not only to update messages, as will be described in greater detail hereinafter but to any message in accordance with the preferred system and method of the present invention which refers to multiple fields.

Figure 8:
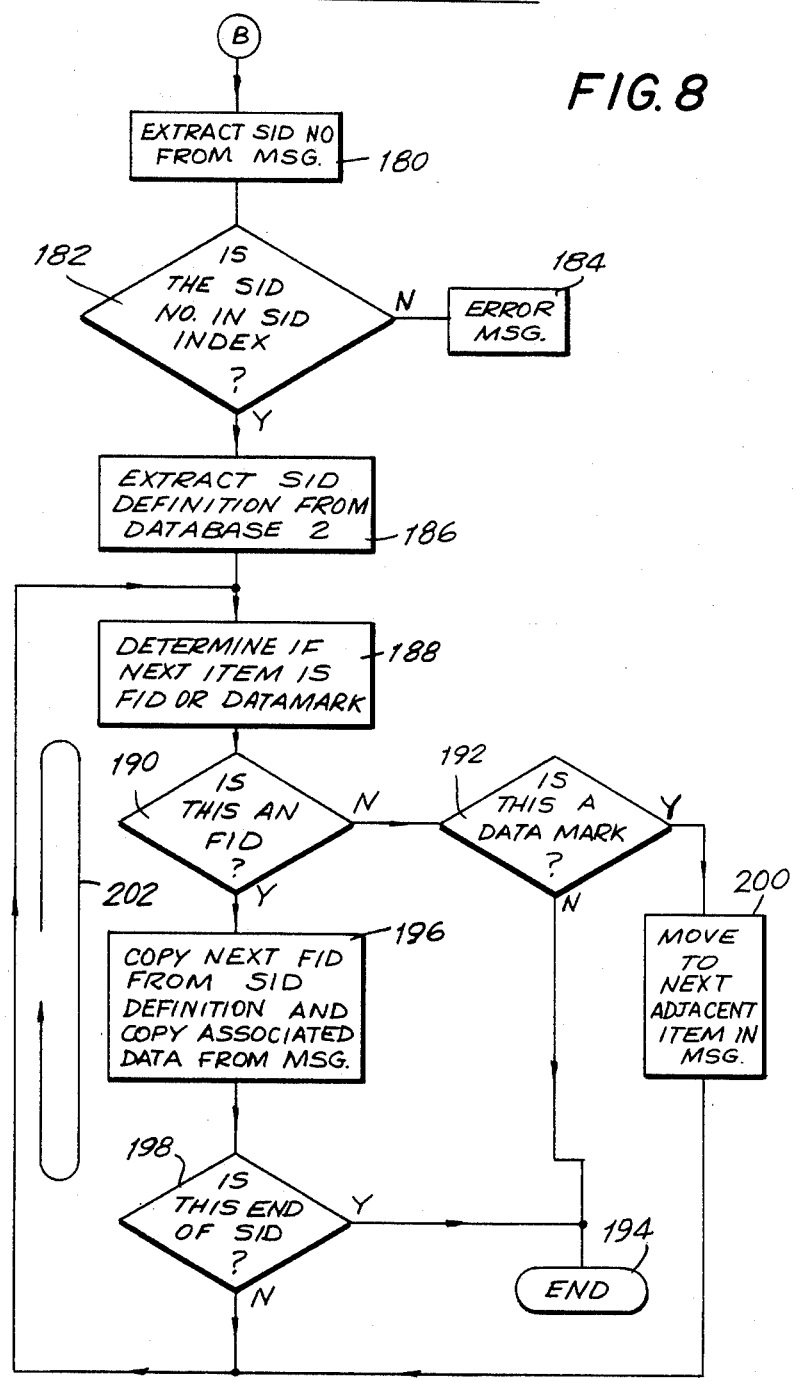
FIG. 8 is a logic flow diagram of the presently preferred method and system of FIG. 1 illustrating the extraction of field identifiers from a set identifier in the method and system of the present invention.

In the presently preferred method and system 28 of the present invention, the aforementioned field sets may be defined dynamically and, accordingly, the presently preferred system and method of the present invention employs a definition and deletion of field sets for any particular field set identifier or SID. The extraction of the field identifier or FIDs from a given field set identifier or SID in a transmitter data base message in accordance with the presently preferred method of the present invention is illustrated in FIG. 8 and shall be described in greater detail hereinafter with reference thereto. A typical field set definition message might generally be defined as SID=1 {1{FID}n[DM]}m with the FID being the field identifier and DM the data mark. In the situation where several fields were associated but received different update values, for example a New York stock exchange trade involving the following hypothetical fields or FIDs: LAST (4), NET (30), DVOL (3), and TIME (32), a field set definition message would be issued, by way of example, containing the following information:

| FIELD NAMES | LAST | DM | NET | DM | DVOL | DM | TIME | DM |
|---|---|---|---|---|---|---|---|---|
| SET DEFINITION | 4 | 0 | 30 | 0 | 31 | 0 | 32 | 0 |

Preferably, where the data mark or DM indicated that different data was expected for each of the associated fields, the field set definition message would contain an SID code which associated the four fields in the above order. In the situation where two or more fields were updated with the same value, for example where a "trade produced a condition where the new LAST PRICE was also the new HIGH PRICE, the fields involved, using the above example, would be as follows: LAST (4), and HIGH (26), and a field set definition message would be issued containing the following data:

| FIELD NAMES | LAST | HIGH | DM |
|---|---|---|---|
| SET DEFINITION | 4 | 26 | 0 |

In the above example the data mark DM indicates that only one piece of data is expected for those fields associated by that SID or field set identifier. Although it does not apply to the above example, with respect to the previous example, it should be noted that for a correct update, all updates containing multiple data items to be applied via the field set identifier or SID must preferably be constructed and applied in the same order as in the field set definitions. As was previously mentioned, multiple and combined cases of the above examples could also be employed in accordance with the presently preferred system and method of the present invention.

As shown by way of example in FIG. 7, a typical storage template 42 preferably includes FID or field identifier information. In addition, as illustrated by way of example in FIG. 7, the storage template 42 preferably includes a field class which indicates for a given set of templates which class of information those templates and associated records relate to. In this regard, it should be noted that a given storage template 42 may preferably be associated with a plurality of records, with each record being uniquely associated with a given storage template 42. The aforementioned field class is a set of information fields defined via the storage template 42 where the FID or field identifier of a particular information field in the class is always the same. Although there may be several storage templates 42 defined for a given class, each field identifier or FID defined in the storage template 42 is always associated with a given field. Hence, some storage templates 42 may be defined to include all the fields in the class and some for a given subset of those fields in a class, although the field identifier or FID definitions are always preferably consistent. In addition, there may also be transient fields in accordance with the presently preferred system 28 and method of the present invention which are defined in order to allow for cases where fields are not stored for retrieval in the usual way, that is, are not normally contained in data base messages, but are transient to the network 28. However, preferably these fields are still identified via a field identifier or FID but since these are transient or non-data base messages, any updates received which would contain a reference to these transient fields would not be applied to the local receiver data base 24 and would only be transmitted in order to allow downstream devices to process or display this type of data immediately. Therefore, no storage need be allocated to these transient fields in the record even though there has been an allocation of a field identifier.

Referring once again to FIG. 7, the storage template 42 concept employed in the presently preferred method and system 28 of the present invention shall be described in greater detail before the presently preferred method of controlling the content of the local receiver data base 24 based on date base messages which affect the entire record as an entity, such as the messages referred to in FIG. 1, is described in greater detail. Thus, the presently preferred storage template 42 is a mechanism by which field identifiers are mapped to positions within the associated local receiver data base 24 storage structure and are themselves stored in the local receiver data base 24 as records, such as the typical storage template 42 illustrated in FIG. 7. The storage templates 42 employed in the presently preferred method and system of the present invention, allow the storage of format information on a field by field basis, thus reducing the amount of information necessary in each update message. By way of example, the presently preferred system 28 of the present invention may employ 255 different storage templates 42, or less, with various storage templates 42 supporting multiple records so that, by way of example, fifty different storage templates 42 could support 100,000 records. Preferably, in the presently preferred system 28 and method of the present invention, the storage templates 42 would be available on the local receiver data base 24 for retrieval, and would preferably be stored locally by every device that needed to do field interpretation since the storage templates 42 are used to decipher the data base messages transmitted to the local receiver data base 24. Although a separate storage template request message may preferably be defined in order that a downstream device from the transmitter data base 20 may obtain storage templates 42 on a as needed basis, once a storage template 42 is initially retrieved from the transmitter data base 20, it is preferably retained by the local receiver data base 24 for future use unless a DROP TEMPLATE message 58 is received from the transmitter data base 20. In addition, storage templates 42 can be built into the software as opposed to being requested.

As previously mentioned, each record on the data base, either the transmitter data base 20 or the local receiver data base 24, preferably has a field associated with the template number or identifier which indicates which storage template 42 the data contained in that record is associated with. A transmitted or arriving field update message would preferably contain a record name, a field identification code and some data or update information. The record name or RIC in the update message preferably identifies the associated storage template 42 to be employed to decipher the update message via the template number field of the record. Each data or information field in the record, which is a self contained integral record, preferably has associated with it in its associated storage template 42, a field identifier or FID, a ripple chain field identifier or RIPFID, some data format information, the field length, and an offset, with the offset held in the storage template 42 showing the position relative to the start of the record at which the particular field starts. The aforementioned format information specifies which transmission encoding format or TEF and data interpretation format or DIF applies when processing the data in that particular information field. Thus, the storage template 42 controls both the deciphering of the data base message and the processing thereof. Once the appropriate associated storage template 42 has been identified, the field identifier or FID extracted from the update message points to the appropriate storage template 42 entry for that field and the data or information can then be applied to the designated record by locating the field within the record via the offset, as will be described in greater detail hereinafter. If the data requires interpretation, the data interpretation format is obtained from the storage template 42 along with the offset allowing the data to be translated prior to its display or processing at the local receiver 24. As was previously mentioned and as will be described in greater detail hereinafter, the ripple chain or RIPFID in the extracted storage template 42 allows individual ripple fields in the record to be chained together by keeping the field identifier number or FID of the next ripple field in the ripple chain. In the above example, if there is a 0 offset in the storage template 42, this would preferably indicate that there was no field in the record corresponding to that particular field identifier.

As was previously mentioned, and as shall be described in greater detail hereinafter with reference to FIGS. 9 and 10, the presence of a ripple chain or RIPFID in the storage template 42, chains or associates ripple fields within a given record so that an update to the first information field in a ripple field chain will affect the other ripple fields within the ripple chain. Preferably, a ripple chain is established in circumstances when an update to a given field in a record would cause data to be overwritten in that field which is still useful data, such as, for example, the last three trade prices of a stock when the information retrieval network is used for transmission of financial information. For example, such a ripple chain would look like the following, assuming hypothetical field identifiers or FID being given in parentheses: LAST (4), LAST-ONE (5), LAST-TWO (6), LAST-THREE (7). In the above example, an update to the field LAST(4), which in the above example is the most current last price of a stock, or other trading instrument, would require that the values of each of the ripple fields in the ripple chain ripple down the record, or be changed such that the old value of LAST-THREE (7), would eventually be lost, with this ripple field representing the third last price of the trading instrument in terms of time. In this regard, it is clear that if the ripple fields in the ripple chain are chronologically related, when the most current information is updated by subsequent information it, of course, becomes the next most current information and so on throughout the ripple chain. This, will be more readily understood by reference to FIG. 10 which shows the processing of a ripple chain and will be explained in greater detail hereinafter with reference thereto. At this point, suffice to say that in the above example a resulting ripple effect will result in the following changes in the information content of the fields in the ripple chain: the field LAST (4) would be changed to contain the new update information from the update message which has been received; the next field LAST-ONE (5) would have its information content changed so as to now contain the information which was previously in the LAST (4) field when the update message was received; the next field LAST-TWO (6) would have its information content changed to the information which was in the LAST-ONE (5) field prior to receiving the update message; and the LAST-THREE (7) field would have its information content changed to contain the information content of the LAST-TWO (6) field immediately prior to receipt of the update message; with the prior information content of the LAST-THREE (7) field immediately prior to receipt of the update message being lost. Thus, it can be seen that a single update message containing information for only a single ripple field in the ripple chain will, in affect, cause the updating of all of the ripple fields in the ripple chain without having to transmit information for each of those fields, thereby resulting in a bandwidth efficiency. It should be noted that preferably, in order for the chaining function in the ripple chain to operate, the ripple chain or RIPFID defined in the storage template 42 should contain, for each ripple field in the ripple chain, an offset to the field identifier or FID of the next ripple field in the ripple chain with, by way of example, a 0 entry being used to indicate either no ripple chain or the end of a given ripple chain. Preferably, ripple occurs only in a forward direction down the record in ascending field identifier order and occurs preferably only as the result of an update message being received by the local receiver data base 24.

In addition, as was also previously mentioned, ADD RECORD, DROP RECORD, ADD TEMPLATE, and DROP TEMPLATE messages are received by the local receiver data base 24 from the transmitter data base 20 and are used for file maintenance of the local receiver data base 24. For example, when an ADD RECORD message is received by the local receiver data base 24, an index entry is created and the data is copied from the data base message into the new record formed in the local receiver data base 24, with the reverse being true for a DROP RECORD message. Similarly, if an ADD TEMPLATE message is received by the local receiver data base 24 and the storage template 42 is not contained in the local receiver data base 24, then an index entry is created and the storage template 42 is copied from the data portion of the message as a new storage template 42 in the local receiver data base 24. Again, the opposite procedure is followed in response to a DROP TEMPLATE data base message. In this manner, dynamic record-by-record control or management of the local receiver data base 24 on an integral record by record basis may be maintained.

"SETTING UP THE LOCAL RECEIVER DATA BASE"

Figure 2:
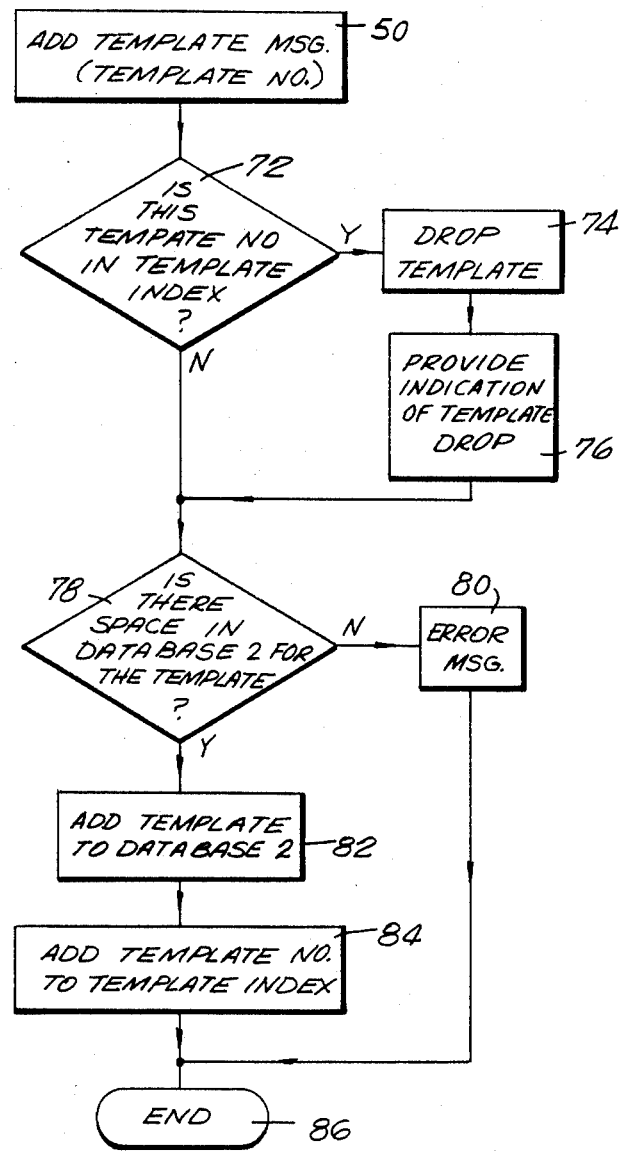
FIG. 2 is a logic flow diagram of the method and system illustrated in FIG. 1 illustrating the setting up of the local receiver data base.

Referring now to FIG. 2, we shall now initially discuss the procedure for setting up the local receiver data base 24 to receive the desired record structures from the transmitter data base 20 in the form of data base messages which are transmitted through the message distribution network 22 and interpreted at the local receiver data base 24. However, before these transmitter data base messages can be interpreted or deciphered, there must be an associated storage template 42 present in the local receiver data base 24 for deciphering the transmitter data base message and processing this message in accordance therewith. The ADD TEMPLATE message 50, as illustrated in FIGS. 1 and 2, is preferably transmitted to the local receiver data base 24 from the transmitter data base 20 via the message distribution network 22 in order to set up the local receiver data base 24 to receive data base messages which affect the record content of the local receiver data base 24. At the local receiver data base 24, the ADD TEMPLATE message 50 is examined for valid signs and template number fields. A check is made to determine if the template number is already present in the template index 70, which check is represented by block 72 in FIG. 2. If the template number is already in the template index and an ADD TEMPLATE message 50 has been received, preferably the previously stored storage template 42 having that template number must be dropped so that it can be replaced by the new storage template 42 being transmitted along with the ADD TEMPLATE message so that the local receiver data base 24 will not have two storage templates 42 with the same template number of identifier. This drop template function, in this instance, along with an indication of such dropped is represented by blocks 74 and 76 in FIG. 2. On the other hand, if the template number is not already present in the template index 70, it is an indication that the storage template 42 is not present in the local receiver data base 24 and a check is then made to determine if there is space in the local receiver data base 24 for storage of the transmitted storage template 42. This function is represented by block 78 in FIG. 2. In the event there is insufficient storage space, then an error message would be generated which is represented by block 80 in FIG. 2. In the more normal instance, where there is sufficient storage space, then the storage template data is extracted from the ADD TEMPLATE message 50 and copied into the indicated storage template, with the added storage template 42 being added to the local receiver data base 24, and with the associated template number or unique identifier for that storage template 42 being added to the template index 70. These functions are represented by blocks 82 and 84 in FIG. 2. After this is accomplished, the processing of the ADD TEMPLATE message 50 has been completed and the procedure ends, as represented by block 86.

A typical ADD TEMPLATE message is represented below

| [TPLNO] | [TEMPLEN] | [RECLEN] | [CLASS] | [DATA] |
|---|---|---|---|---|
| (8) | (16) | (16) | (8) | (V) |

TPLNO = Template number
TEMPLEN = Number of entries in template
RECLEN = Length in bytes of associated record (excluding header)
CLASS = Template Class
DATA =
0 {FID, RIPFID, TEF, DIF, FLDLEN, OFFSET} 32,767
  (16)  (8)   (4)  (4)  (8)     (16)
FID = Field Identifier Number
RIPFID = Ripple Field Identifier
TEF = Transmission Encoding Format
DIF = Data Interpretation Format
FLDLEN = Length of Field in Bytes
OFFSET = Offset of Field in Record
[DATA] field portions of the above message are preferably transmitted in ascending FID order, omitting any entries for FIDs which do not exist in the template 42.

In order to further understand the processing of the ADD TEMPLATE message 50 in the local receiver data base 24 microcomputer, the following programming explanation is provided below in Table A, with this programming information being translated into Pascal, by way of example, for running on the Digital Equipment Corporation MICROVAX:

TABLE A

```
PROCESS_ADD_TEMPLATE_MSG
begin
        GET_SIZE (MSG_SIZE)
        GET_TPLNO (TPLNO)
        GET_TEMPLEN (TEMPLEN)
        GET_RECLEN (RECLEN)
        GET_CLASS (CLASS)
if STATUS = NO_ERROR
then
        if (TEMPLATES [TPLNO].TEMPLEN #0)
        then
            DROP_TEMPLATE (TPLNO)
            REPORT_ERROR ("TEMPLATE_DROPPED")
        else
        end if
        TEMPLATES [TPLNO].TEMPLEN: = TEMPLEN
        TEMPLATES [TPLNO].RECLEN: = RECLEN
        TEMPLATES [TPLNO].CLASS: = CLASS
        i: = 0
        repeat
            GET_FIC(CURR_FID)
            TEMPLATES [TPLNO].DATA [CURR_FID].FID: = CURR_FID
            GET_BYTE (RIPFID)
            TEMPLATES [TPLNO].DATA [CURR_FID].RIPFID: = RIPFID
            GET_BYTE (TEFDIF)
            TEMPLATES [TPLNO].DATA [CURR_FID].TEF: = TEFDIF MOD 16
            TEMPLATES [TPLNO].DATA [CURR_FID].DIF: = TEFDIF DIV 16
            GET_BYTE (FLDLEN)
            TEMPLATES [TPLNO].DATA [CURR_FID] FLDLEN: = FLDLEN
            GET_WORD (OFFSET)
            TEMPLATES [TPLNO].DATA [CURR_FID].OFFSET: = OFFSET
            i = i + 1
```

TABLE A-continued

```
        until (i = TEMPLEN)
        UPDATE_STATS
    else
    endif
end.
```

"ADDING A NEW RECORD TO THE LOCAL RECEIVER DATA BASE"

Figure 3:
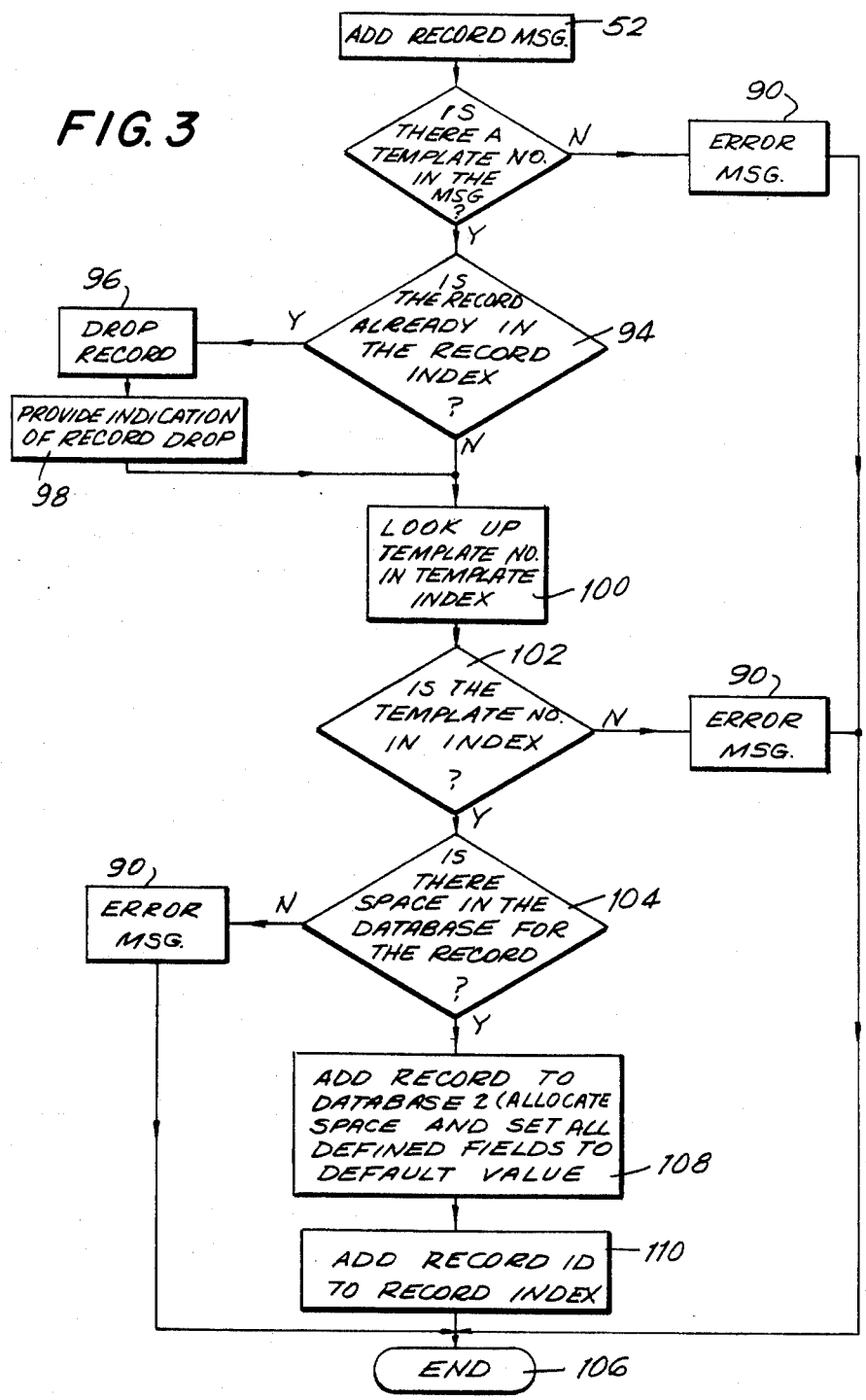
FIG. 3 is a logic flow diagram of the presently preferred method and system of FIG. 1 illustrating the adding of a new record to the local receiver data base.

The above situation referred to in FIG. 2 refers to the data base maintenance procedure for adding a storage template 42 to the local receiver data base 24. However, the more normal procedure encountered is the incremental addition of new records to the local receiver data base 24 after the appropriate storage templates 42 have been stored in the local receiver data base 24. Such a situation is illustratively represented in FIG. 3. The ADD RECORD message 52 is a procedure for checking to see if the record to be added to the local receiver data base 24 is already stored in the local receiver data base 24 and if there is enough space in the local receiver data base 24 to store the record to be added. As shown and preferred in FIG. 3, in processing the ADD RECORD message 52, the local receiver data base 24 checks to see if there is a template number in the message and generates an error message if no template number is present. These functions are represented by blocks 88 and 90 in FIG. 3. Assuming a template number is present in the ADD RECORD message 52, which is preferably a requirement of all data base messages so that they can be deciphered at the local receiver data base 24 and processed there, a check is then made to determine if the record to be added is already present in the record index 92 resident in the local receiver data base 24. This function is represented by block 94 in FIG. 3. If the record is already resident in the record index 92 then, preferably, the record is dropped and an indication of record drop is provided so that storage space is not wasted by storing the same record twice. These functions are represented by blocks 96 and 98 in FIG. 3. If, however, the record is not already resident in the record index 92, then the template number associated with the transmitted data base message is then looked up in the template index 70. This function is represented by block 100 in FIG. 3. If a template number is not resident in the template index 70, which indicates that no storage template 42 has been previously stored in the local receiver data base 24 so that the record cannot then be deciphered and processed, an error message is provided. These functions are represented by blocks 102 and 90 in FIG. 3. Assuming, however, that the template number associated with the transmitted record is contained in the template index 70, a check is then made to determine if there is space in the local receiver data base 24 for the record to be stored. This function is represented by block 104 in FIG. 3. If there is not sufficient space to store the record, then an error message is generated and the process ends. This function is represented by blocks 90 and 106 in FIG. 3. If, however, there is sufficient space in the local receiver data base 24 to store the transmitted record, then the record is added to the local receiver data base 24, with a typical such record being represented by reference numeral 40 in FIG. 7, with the space required to store the record being allocated in the local receiver data base 24, and with all defined fields being set to a default value. This function is represented by block 108 in FIG. 3. The record identification code or RIC is also added to the record index 92 and the procedure is then complete. This is represented by the blocks 110 and 106 in FIG. 3.

As in the above example of the ADD TEMPLATE message 50, this ADD RECORD function can be further described in a programming information format which can readily be converted into PASCAL, by way of example, to run on the Digital Equipment Corporation MICROVAX. This ADD RECORD function can be broken into two aspects, one dealing with the checking to see if the record 40 is already in the local receiver data base 24, which programming function is represented below in Table B, and into an ADD RECORD primitive of function that checks to see if there is sufficient space in the local receiver data base 24 for the record to be stored, which is represented in Table C:

TABLE B

```
PROCESS_ADD_RECORD_MSG
begin
        GET-SIZE (MSG_SIZE)
        GET_NAME (CURR_NAME)
        GET_TPLNO (CURR_TPLNO)
        IF STATUS: = ERROR THEN
            REPORT_ERROR ("NO TEMPLATE NO._IN_ADD_MSG")
            EXIT
        END
        GET_RTL (CURR_RTL)
        STATUS: = LOCATE_RECORD
        if STATUS = RECORD_LOCATED
        then
            REPORT_WARNING (DROP DUE TO DUPLICATE ADD)
            STATUS: = DELETE_RECORD
        else
        end if
        ADD_RECORD (NAME, RTL, TPLNO)
end.
```

TABLE C

```
ADD_RECORD (NAME, RTL, TPLNO)
begin
```

TABLE C-continued

```
        if (A_E_S.FREE_CTR = 0)
        then
            STATUS: = ERROR
            REPORT_ERROR (NO ACCESS ENTRIES AVAILABLE TO ADD RECORD)
            UPDATE_STATS
        else
            PHYS_RECS : = TEMPLATES [TPLNO].RECLEN div PHYS_REC_SIZE
            if (TEMPLATES [TPLNO].RECLEN mod PHYS_REC_SIZE.GT.0)
            then
                PHYS-RECS : = PHYS_RECS + 1
            else
            end if
            if (P_R_S.FREE_CNT.LT.PHYS_RECS)
            then
                STATUS : = ERROR
                REPORT_ERROR (NO ROOM TO ADD ADDITIONAL RECORD)
                UPDATE_STATS
            else
                FIRST_PR_PTR : = P_R_S.FREE-PTR
                repeat
                    PR_PTR : = P_R_S.FREE_PTR
                    P_R_S.FREE_PTR : = P_R_S.FREE_PTR::FWRD_PTR
                    PR_PTR::FWRD_PTR : = P_R_S.FREE_PTR
                    P_R_S.FREE_CNTR : = P_R_S.FREE_CNTR - 1
                    PHYS_RECS : = PHYS_RECS - 1
                until PHYS_RECS = 0
                PR_PTR::FWRD_PTR : = NIL
                NEW_AE_PTR : = A_E_S.FREE_PTR
                A_E_S.FREE_CNTR : = A_E_S.FREE_CNTR - 1
                A_E_S.FREE_PTR : = A_E_S.FREE_PTR::FWRD_PTR
                AE_PTR : = A_C_T [IODBA.HASH].AE_PTR
                if AE_PTR # NIL
                then
                    repeat
                        PREV_AE_PTR : = AE_PTR
                        AE_PTR : = AE_PTR::FWRD_PTR
                    until AE_PTR = NIL
                    PREV_AE_PTR::FWRD_PTR : = NEW_AE_PTR
                    NEW_AE_PTR::BACK_PTR : = PREV_AE_PTR
                    NEW_AE_PTR::FWRD_PTR : = NIL
                else
                    A_G_T [IODBA.HASH].AE_PTR : = NEW_AE_PTR
                    NEW_AE_PTR::BACK_PTR : = NIL
                    NEW_AE_PTR::FWRD_PTR : = NIL
                end if
                NEW_AE_PTR::ALPHA_NAME : = NAME
                NEW_AE_PTR::RTL : = RTL
                NEW_AE_PTR::TPLNO : = TPLNO
                NEW_AE_PTR::ACCESS_CNTR: = 1
                NEW_AE_PTR::DATA_PTR : = FIRST_PR_PTR
                NEW_AE_PTR::PHYS_REC_CNT : = PHYS_RECS
                M_C_B.CUR_AE_PTR : = NEW_AE_PTR
                M_C_B.NUM_PHYS_RECS : = PHYS_RECS
                M_C_B.FIRST_PHYS_REC : = FIRST_PR_PTR
        end if
    end if
end.
```

"DROPPING A RECORD FROM THE LOCAL RECEIVER DATA BASE"

Figure 4:
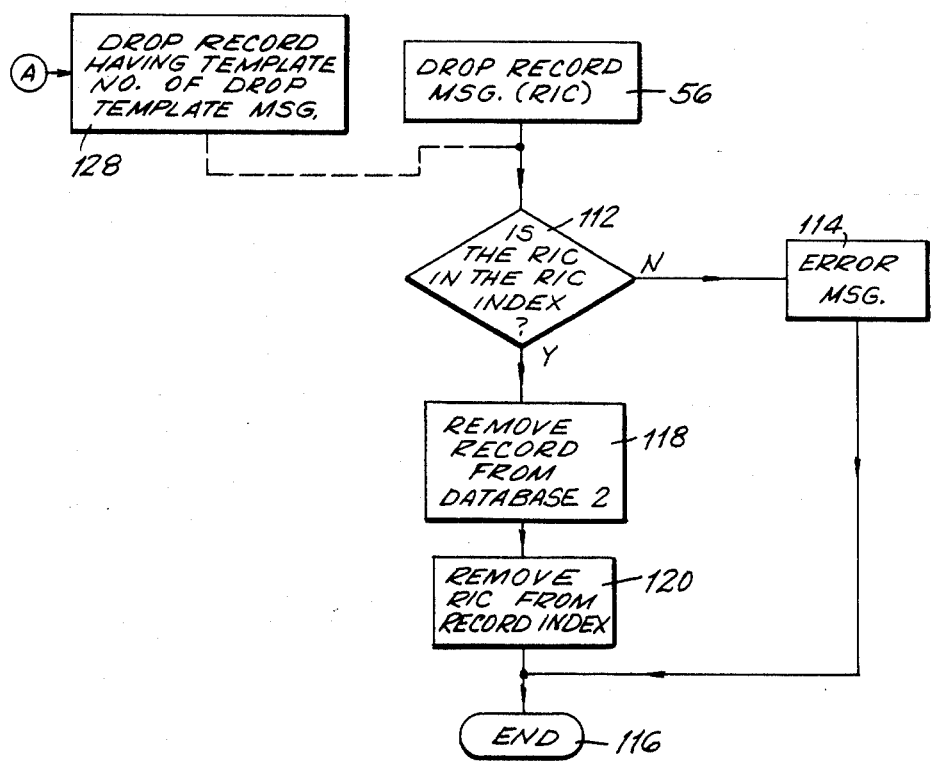
FIG. 4 is a logic flow diagram of the presently preferred method and system of FIG. 1 illustrating the dropping of a record from the local receiver data base.
Figure 5:
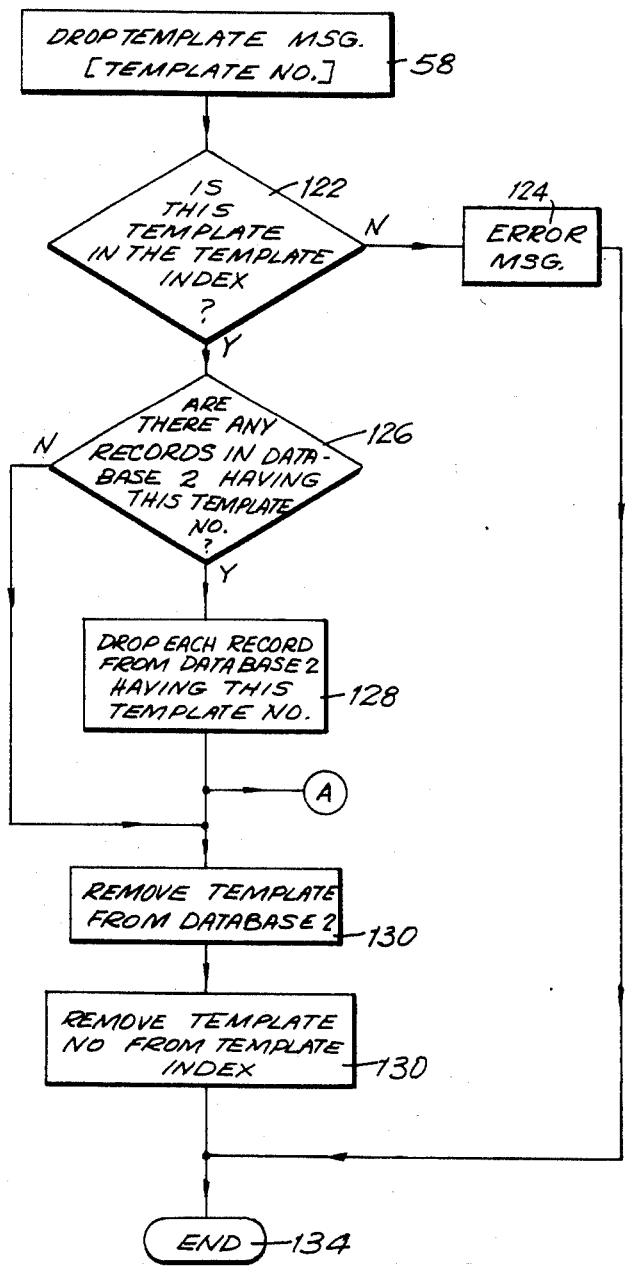
FIG. 5 is a logic flow diagram of the presently preferred method and system of FIG. 1 illustrating the dropping of a template from the local receiver data base.

Similarly, a record may also be incrementally deleted from the local receiver data base 24, with FIG. 4 relating to the DROP RECORD data base message 56. As illustrated in FIG. 4, the dropping of a stored record from the local receiver data base 24 can occur as a result of a DROP TEMPLATE message 58 to be described in greater detail with reference to FIG. 5, or as a direct result of receipt of DROP RECORD message 56. At this point, the dropping of a record from the local receiver data base 24 shall be described solely in response to receipt of a DROP RECORD message 56 with the other alternative being dealt with when FIG. 5 is described. Again, as was true with respect to the ADD RECORD data base message 52, the DROP RECORD data base message 56 involves two aspects, one of which is in an attempt to first check if the record to be dropped is stored in the local receiver data base 24 and, thereafter, the actual dropping or removal, incrementally, of the stored record from the local receiver data base 24, assuming it is found. These functions are broadly illustrated in FIG. 4 with the determination of whether or not the record is stored in the local receiver data base 24 being accomplished by checking the record indicator code or RIC index 92 to see if the RIC contained in the DROP RECORD message 56 is located in the record index 92. This function is represented by block 112 in FIG. 4. If the RIC contained in the DROP RECORD message 56 is not in the record index 92, then an error message is generated and the procedure is ended. This is represented by blocks 114 and 116 in FIG. 4. The absence of the RIC from the record index 92 is an indication that the record to be dropped was not stored in the local receiver data base 24. If however, the RIC in the DROP RECORD message 56 is contained in the record index 92, then this is an indication that the record is present in the local receiver data base 24 and the DROP RECORD message 56 is then processed to remove the record from the local receiver data base 24. This is represented by block 118 in FIG. 4. In addition, the RIC associated with the removed record is then dropped from the record index 92 since the record is no longer stored in the local receiver data base 24. This is indicated by block 120 in FIG. 4x. The procedure is then ended as represented by block 116.

Again, as was true with respect to the above functions, the programming information for carrying out the function illustrated in FIG. 4, and which may readily be converted into PASCAL for running on the Digital Equipment Corporation MICROVAX, is given below in Tables D and E, where Table D represents the portion of the DROP RECORD function which relates to checking to see if the record is present in the local receiver data base 24, and Table E represents the function of actually removing the record 40 from the local receiver data base 24, assuming it is present therein.

in the template index 70 of the local receiver data base 24 since, if the template number is not present in the template index 70, then the DROP TEMPLATE message 58 is erroneous with respect to that local receiver data base 24 and an error message is provided. This function is represented by the blocks given reference numerals 122 and 124 in FIG. 5. Assuming the template number associated with the DROP TEMPLATE message 58 is present in the template index 70, a determination must then preferably be made as to whether there are any records stored in the local receiver data base 24 associated with this storage template number. In this regard, as previously mentioned, each stored record in the local receiver data base 24 has an associated storage template 42 which has a corresponding unique identifier or storage template number although a given storage template 42 may be associated with a plurality of different records 40 in the local receiver data base 24. This determination is represented by the block given reference numeral 126 in FIG. 5. If there are records 40

TABLE D

```
PROCESS_DROP_RECORD_MSG
begin
GET_SIZE (MSG_SIZE)
GET_NAME (CURR_NAME)
STATUS : = DROP_RECORD (NAME)
if STATUS : = RECORD_DELETED
then
        UPDATE_STATS
else
        REPORT_ERROR ("ATTEMPTED_DELETE, RECORD NOT PRESENT")
    end
end
```

TABLE E

```
DROP_RECORD (M_C_B)
begin
        AE_PTR : = M_C_B.CUR_AE_PTR)
        if (AE_PTR::BACK_PTR = NIL)
        then
            [remove head of an access chain]
            A_G_T [M_C_B.HASH].AE_PTR : = AE_PTR::FWRD_PTR
        else
            if (AE_PTR::FWRD_PTR = NIL)
            then
                [remove tail of an access chain]
                AE_PTR::BACK_PTR : = AE_PTR : = NIL
            else
                [remove middle of an access chain]
                AE_PTR::BACK_PTR::FWRD_PTR : = AE_PTR::FWRD_PTR
                AE_PTR::FWRD_PTR::BACK_PTR : = AE_PTR::BACK_PTR
            endif
        endif
    AE_PTR::FWRD_PTR : = A_E_S.FREE_PTR
    A_E_S.FREE_PTR : = AE_PTR
    A_E_S.FREE_CNTR? − A_E_S.FREE_CNTR + 1
end.
```

"DROPPING A TEMPLATE FROM THE LOCAL RECEIVER DATA BASE"

As was mentioned above with respect to FIG. 4, a record 40 can also be dropped as a result of the processing of a DROP TEMPLATE data base message 58 transmitter from the transmitted data base 20 to the local receiver data base 24. The processing of such a DROP TEMPLATE message 58 in accordance with the presently preferred method and system of the present invention is illustrated in FIG. 5. As shown and preferred in FIG. 5, upon receipt of the DROP TEMPLATE data base message 58, the local receiver data base 24 determines if the template number associated with the DROP TEMPLATE data base message 58 is which have been stored in the local receiver data base 24 which are associated with the storage template number contained in the DROP TEMPLATE data base message 58, then each record 40 in the local receiver data base 24 having this associated storage template number is preferably dropped or deleted from the local receiver data base 24. This function is represented by reference numeral 128 in FIG. 5. In this instance, assuming that the record 40 is to be dropped, the process illustrated in FIG. 5 branches to the process illustrated and previously described with reference to FIG. 4 so that a determination is then made as previously explained, if the RIC is present in the record index 92 and, assuming it is, the record is removed from the local receiver data base 24 and the RIC is removed from the record index 92 as illustrated in FIG. 4. This procedure is preferably repeated for each record 40 associated with the template number contained in the DROP TEMPLATE data base message 58. In addition to dropping the records associated with this template number, as further shown and preferred in FIG. 5, the associated storage template 42 is also removed from the local receiver data base 24. This function is represented by the block given reference numeral 130 in FIG. 5. In addition, the template number or identifier is also removed from the template index 70 in the local receiver data base 24 which function is illustrated by the block given reference numeral 132 in FIG. 5. The processing of the DROP TEMPLATE message 58 is then completed, as represented by the block given reference numeral 134. In the instance where there are no records 40 stored in the local receiver data base 24 which are associated with the template number contained in the DROP TEMPLATE message 58, then what preferably occurs in response to DROP TEMPLATE message 58 is the removal of the storage template from the local receiver data base 24 and the removal of the template number form the template index 70, as also illustrated in FIG. 5.

The above processing of a DROP TEMPLATE data base message 58 can also be described in terms of the following programming information format given below in Table F, which may readily be converted to PASCAL for use with the Digital Equipment Corporation MICROVAX:

of a record without having to transmit a data base message having separate specified information for each information field to be updated. FIGS. 6A, 6B, 8, 9, 10, 11 and 12 all relate to this important updating function and shall be described in greater detail hereinafter at this time. The UPDATE RECORD data base message 54 is illustrated in block 54 in FIG. 6A. This update record data base message preferably contains a record identification code or RIC, a field identification code or FIC and a data content of update information for the information fields corresponding to the field identification code of the associated record 40 which corresponds to the record identification code. As was previously mentioned, this field identification code or FIC could consist of one or more field identifiers or FIDs, or one or more set identifiers or SIDs, or a combination of field identifiers and set identifiers. As was previously mentioned, a set identifier is really a bandwidth efficient way of transmitting information for a plurality of fields or field identifiers and, accordingly, the associated field identifiers or FIDs must be extracted from the transmitted set identifiers or SIDs at the local receiver data base 24. This extraction process shall be described in greater detail hereinafter with reference to FIG. 8. However, before doing that, we shall describe the updating of a record in the local receiver data base 24 for any given field identifier, with the understanding that the process is repeated for each field identifier defined in the UPDATE RECORD data base message 54, whether it is individually defined or whether it is defined as a result of a transmitted set identifier from which it must be extracted in accordance with the process illustrated in

TABLE F

```
       PROCESS_DROP_TEMPLATE_MSG
begin
       GET-TPLNO (TPLNO)
       if TEMPLATES [TPLNO] = 0 then
            REPORT_ERROR ("ATTEMPTED DISCARD, TEMPLATE NOT DB")
       else
            I = 1
            while I = TOTAL_NO_OF_RECS do record : = LOCATE_NEXT_
                                                         RECORD (I)
            if RECORD.TPLATE = TPLNO THEN
            DROP_RECORD (RECORD)
            else
            end
            I = I + 1
       end if
       TEMPLATES [TPLNO] = 0
end
```

"UPDATING A RECORD IN THE LOCAL RECEIVER DATA BASE"

Up to this point we have described various data base messages which primarily relate to the construction of the local receiver data base 24, such as by incrementally increasing or decreasing the record content of the local receiver data base 24 as well as the associated storage template content used to decipher these records and for processing thereof. However, the bandwidth efficiencies of the presently preferred method and system of the present invention are most apparent in connection with the updating of a typical record 40 stored in the local receiver data base 24, particularly since each of the stored records 40 preferably contains multiple information fields, several or all of which may have to be updated at any given time. As generally explained above, through the use of a ripple chain of ripple fields and set identifiers along with the associated storage templates 42, updates can be provided in several information fields FIG. 8. Referring once again to FIG. 6A, the record identification code or RIC is extracted from the UPDATE RECORD data base message 54 at the local receiver data base 24, which is represented by the block given reference numeral 140 in FIG. 6A. A determination is then made as to whether the record identification code or RIC extracted from the UPDATE RECORD data base message 54 is present in the record index 92, which function is represented by the block given reference numeral 142 in FIG. 6A. If the RIC is not stored in the record index 92, then an error message is provided, which function is represented by the block given reference numeral 144, and the processing of the UPDATE RECORD data base message 54 at this particular local receiver data base 24 is terminated, as represented by the block given reference numeral 146 in FIG. 6B. If however, the RIC is present in the record index 92, then the template number is extracted from the record 40 already stored in the local receiver data base 24 as represented by the block given reference numeral 148 in FIG. 6A. UPDATE RECORD data base message 54 is then examined and the field identification code or FIC is then extracted from the UPDATE RECORD data base message 54, as represented by the block given reference numeral 150 in FIG. 6A. A determination is then made as to whether the field identification code which has been extracted represents a set identifier or SID, which is represented by the block given reference numeral 152 in FIG. 6A. If the field identification code does represent an SID then, as previously mentioned, the individual field identifiers or FIDs must be extracted from the set identifier or SID, which is preferably accomplished in the manner to be described with reference to FIG. 8, and then the processing continues for each extracted field identifier. Alternatively, if the extracted FIC does not represent an SID, then the processing continues of the UPDATE RECORD data base message 54 for that field identifier or FID. In either instance, the extracted field identifier or FID entry is located in the extracted storage template 42 which defines the field offset, the field length and the transmission encoding format or TEF. This is represented by the block given reference numeral 156 in FIG. 6A. It should be noted that the field offset is defined as the position of that field defined by the FID relative to the start of the affected record, with such an offset being illustrated in FIG. 12. The processing of the UPDATE RECORD data base message 54 continues with an examination of the ripple chain identifier or RIPFID for that extracted field identifier or FID in the associated storage template 42 contained in the local receiver data base 24, as represented by the block given reference numeral 158 in FIG. 6B. A determination is then made as to whether the RIPFID of the storage template 42 is 0 or not, which is represented by the block given reference numeral 160 in FIG. 6B, since, as previously described, the presence of a 0 would indicate either the end of a ripple chain or that no ripple chain at all were present. If the ripple chain identifier or RIPFID was not a 0, this would indicate the presence of a ripple chain to be processed in response to the UPDATE RECORD data base message 54 and the ripple would preferably be processed, as generally represented by the block given reference numeral 162 in FIG. 16, in a manner to be described in greater detail hereinafter with reference to FIGS. 9, 10 and 12. If, however, the ripple chain identifier is 0, or, alternatively after the ripple has been processed, if this identifier is 0, the next step in the processing of the UPDATE RECORD data base message 54 is to locate the position of the given field identifier or FID in the record 40 to be updated as indicated by the RIC content of the UPDATE RECORD data base message 54, with the FID position being located based on the field offset contained in the storage template 42. This function is illustrated by the block given reference numeral 164 in FIG. 6B.

Figure 6A:
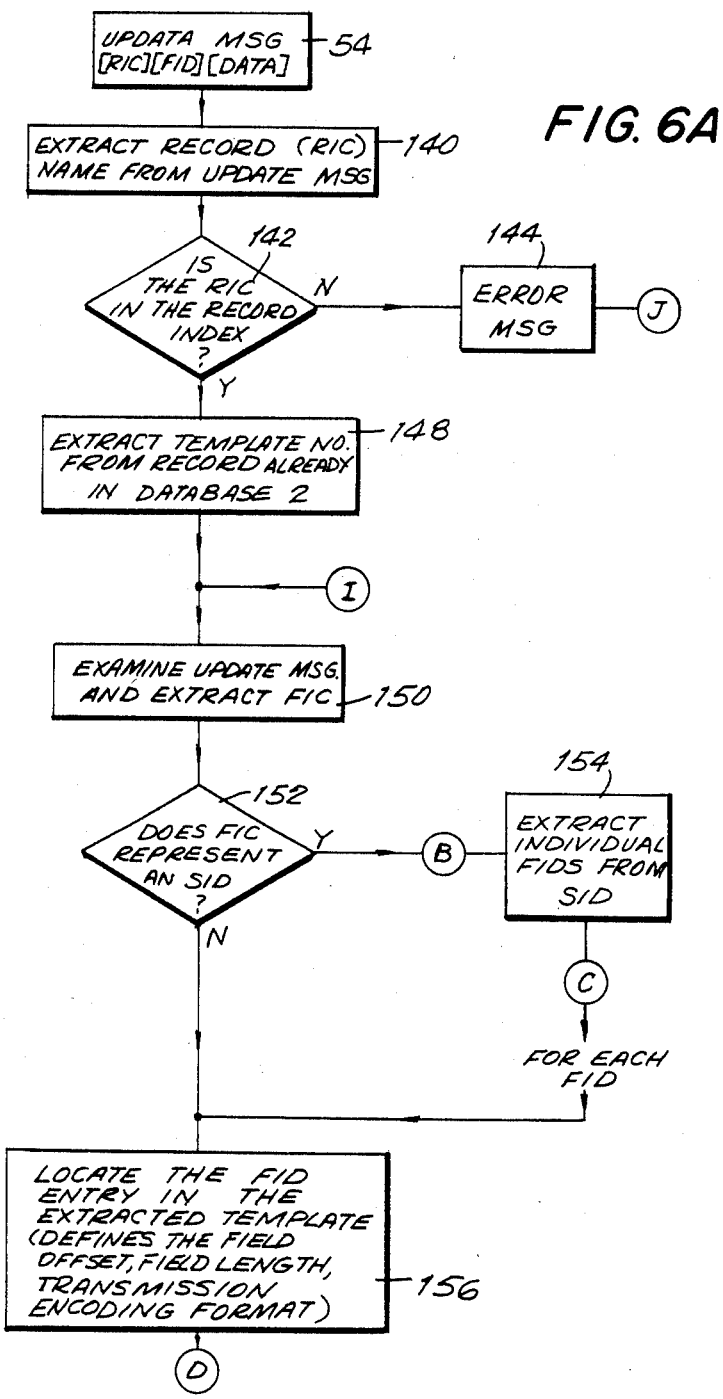
FIGS. 6A and 6B together comprise a logic flow diagram of the presently preferred method and system of FIG. 1 illustrating the updating of a record in the local receiver data base.
Figure 6B:
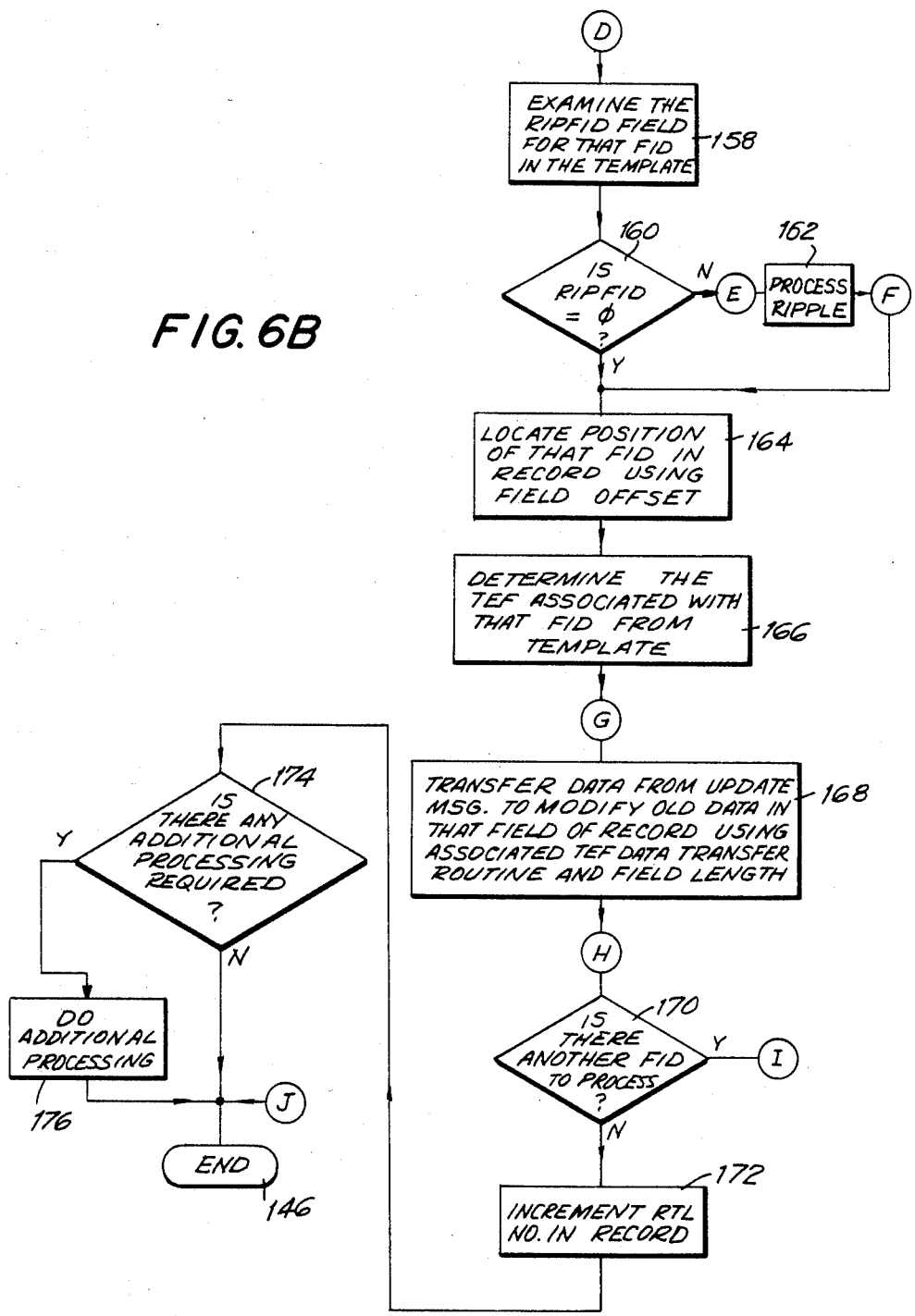

The transmission encoding format or TEF associated with that field identifier or FID is also determined from the storage template 42, as represented by the block given reference numeral 166 in FIG. 6B. Once the position of the field to be updated and the record is known, and the transmission encoding format is known so that the message can be deciphered, update information or data is transferred from the UPDATE RECORD data base message 54 to the stored record 40 appropriate information field corresponding to the FID using the associated transmission encoding format or TEF data transfer routine and field length, as illustration in FIG. 11. This function is represented by the block given reference numeral 168 in FIG. 6B and will be described in greater detail hereinafter with reference to FIGS. 11 and 12. In this regard it should be noted that the transmission encoding format or TEF defines the way the particular field is encoded in the UPDATE RECORD data base message 54. A determination is then made as to whether there is any other field identifier or FID to process in the UPDATE RECORD data base message 54 received by the local receiver data base 24. This is represented by the block given reference numeral 170 in FIG. 6B. If there is another field identifier to process, then the aforementioned process is preferably repeated at the point where the UPDATE RECORD data base message 54 is again examined and the next FIC or field identification code extracted, as represented by the block given reference numeral 150 in FIGS. 6A, with this process preferably being continually repeated until all field identifiers or FIDs present in the UPDATE RECORD data base message 54 are processed. When there are no more FIDs to process in the UPDATE RECORD data base message, the record transaction level number or RTL in the stored record 40 is preferably incremented to indicate that the record 40 has been updated. Thus, the RTL is a convenient way of being able rapidly examine the number of change messages applied to any given record 40 although it may be omitted, if desired, without departing from the spirit and scope of the present invention. This RTL number incrementing function is represented by the block given reference numeral 172 in FIG. 6B. A determination is then made as to whether any additional processing for the record 40 is required, as represented by the block given reference numeral 174 in FIG. 6B and, if such additional processing is required, it then preferably proceeds, as represented by reference the block given numeral 176 in FIG. 6B. In either instance, the processing of the UPDATE RECORD data base message 54 is thereafter terminated, as represented by the block given reference numeral 146.

"EXTRACTION OF FIELD IDENTIFIERS FROM SET IDENTIFIERS"

Referring now to FIG. 8, the extraction of the field identifiers or FIDs associated with a given set identifier or SID contained in an UPDATE RECORD data base message 54, and generally represented by the block given reference numeral 154 in FIG. 6A, shall now be described in greater detail. In this regard, the set identifier has to preferably be translated into the format of field identifier or FID followed by its associated data so that the processing of the UPDATE RECORD data base message 54 for each of the information fields to which the set identifier refers can take place. It should be noted that if the field identifiers or FIDs are of different value, then the set identifier definition will preferably consist of each field identifier separated by a data mark, which is a logical place keeper, whereas, if the field identifiers are of the same value, then the SID definition would preferably consist of all of the field identifiers adjacent to each other, with a data mark following the last field identifier. As was previously mentioned, the set identifier or SID can be used to define a one-to-one relationship in which for every field changed, a new value is in the message and is generally different, or can be used to define a one-to-many situation in which only one common piece of data in the message having a single value is put into several fields. In either instance, it should be noted that the order of data in the message is important since it preferably matches the order of fields as defined in the set identifier.

In extracting the associated FIDs from the set identifier, the SID number must first preferably be extracted from the UPDATE RECORD data base message 54, as represented by the block given reference numeral 180 in FIG. 8. A determination is then made whether the SID number which has been extracted from the UPDATE RECORD data base message 54 is in the SID index stored at the local receiver data base 24. This function is represented by the block given reference numeral 182 in FIG. 8. If the extracted SID number is not in the SID index, then an error message is generated, as represented by the block given reference numeral 184 in FIG. 8. If, however, the SID number is contained in the SID index at the local receiver data base 24, then the SID definition associated with that SID number is extracted from the local receiver data base 24, as represented by the block given reference numeral 186 in FIG. 8. After the definition has been extracted, a determination is then made if the next item in the SID definition is a field identifier or FID or a data mark which function is represented by the block given reference numerals 188, 190, and 192 in FIG. 8. If it is not a field identifier, and is not a data mark, then the extraction process of FIG. 8 is terminated, as represented by the block given reference numeral 194. If, however, the item is a field identifier, then the next field identifier is preferably copied from the SID definition and the associated data is copied from the message, as represented by the block given reference numeral 196 in FIG. 8, and a determination is then made as to whether or not this is the end of the SID definition, as represented by the block given reference numeral 198. If it is the end of the SID definition, then the extraction process is terminated, as represented by the block given reference numeral 194. If, however, it is not the end of the SID definition, then the process preferably repeats, with a determination being made if the next item is a field identifier or a data mark, and with this process preferably continuing to loop until the end of the SID definition, as illustrated in FIG. 8. Similarly, if the item is not an FID, but is a data mark, then, as indicated in FIG. 8, the processing preferably moves to the next adjacent item in the message to determine if the next item is an FID or a data mark. This function is represented by the block given reference numeral 200 in FIG. 8. The processing is then preferably repeated until the end of the SID definition. It should be noted that if the same value is to be copied from the UPDATE RECORD data base message 54 into multiple information fields which correspond to the FIDs defined in the SID, then there is no data mark until the end, i.e., until all of the field identifiers have been defined. This causes the loop represented by the arrow 202 in FIG. 8 to repeat continually until the data mark is reached. Similarly, as described above, if there are different values for each of the FIDs then there will be a data mark after each FID and the processing will preferably continue in the manner of FIG. 8 until the last data mark is reached.

The aforementioned processing of the UPDATE RECORD data base message 54 can also be defined in terms of a programming information format, which may readily be converted into PASCAL for running on the Digital Equipment Corporation MICROVAX computer with, this programming information format being given below in Table G:

TABLE G

```
PROCESS_UPDATE_MSG
begin
        GET_SIZE (MSG_SIZE)
        GET_NAME (NAME)
            STATUS - LOCATE_RECORD
        IF STATUS = RECORD_LOCATED
        then
            UPDATE_LOCATED
        else
            REPORT_EPROM ("UPDATE FOR NONEXISTANT RECORD")
        end
end
UPDATE_RECORD (MSG_INDEX)
begin
        UPDATE_RECORD : = NO_ERROR
        while (MSG_INDEX.LT.MSG_SIZE) and (UPDATE_RECORD = NO_ERROR)
            STATUS : = GET_FIC (MSG_INDEX, CURR_FIC)
            if STATUS = ERROR
            then
                REPORT_ERROR (FIC EXTENDS BEYOND END OF MESSAGE)
                UPDATE_STATS
                UPDATE_RECORD : = FIC_OVERRUN
            else
                if STATUS = FID_FOUND
                    then
                        CURR_FID : = CURR_FIC
                        UPDATING_BY_SID : = FALSE
                        FDAT_INDEX : = MSG_INDEX + 2
                else
                        CURR_SID : = CURR_FIC
                        UPDATING_BY_SID : = TRUE
                        FDAT_INDEX : = MSG_INDEX + 1
                endif
                if UPDATING_BY_SID
                then
                    if CURR_SID = 0
                    then
                        CREATE_SID_0 ()
```

TABLE G-continued

```
                  else
                  endif
                  STATUS : - LOCATE__FSD (CURR__SID)
                  if STATUS = ERROR
                    then
                        REPORT__ERROR (UNDEFINED SID IN MESSAGE)
                        UPDATE__STATS
                        UPDATE__RECORD : = UNDEFINED__SID
          else
                  FSI : = 1 (Field Set Index)
                  GET__LOW__NIB TRUE
                  while (FSI.LT. FSDS [CURR__SID].FSETLEN
                     repeat
                        CURR__FID : = FSDS [CURR__SID].DATA [FSI]
                        PROCESS__MSG__FDAT (CURR__FID,
                                              FDAT__INDEX,
                                              FDAT__SIZE)
                        FSI : = FSI + 1
                     until FSDS [CURR__SID].DATA[FISI] = DM
                        FDAT__INDEX : = FDAT__INDEX + FDAT__SIZE
                  endwhile
                  MSG__INDEX : = FDAT__INDEX FDAT__SIZE
                  PROCESS__MSG__FDAT (CURR__FID),
                  FDAT__INDEX,
                  FDAT__SIZE)
          endif
       endif
    endwhile
end.
```

"PROCESSING THE RIPPLE CHAIN"

Referring now to FIGS. 9 and 10, the processing of the ripple chain, which is generally given reference numeral 162 in FIG. 6B, shall now be described in greater detail. As was previously mentioned, a ripple chain identifier or RIPFID refers to a ripple chain of related ripple fields which are all changed as a result of the change of a single information field or FID which has been updated based on the update data content for that field in the UPDATE RECORD data base message 54 without requiring the transmission of update information for each of the other ripple fields in the ripple chain, thereby resulting in considerable bandwidth efficiency. FIG. 9 generally illustrates the processing of the ripple function based on the determination that the ripple chain identifier or RIPFID of the storage template 42 associated with the UPDATE RECORD data base message 54 is not 0. In such an instance, the old data information content associated with the first FID in the ripple chain is extracted and the transmitted new or update information for that FID, which is contained in the UPDATE RECORD data base message 54, is then inserted in that first FID in the ripple chain. These functions are represented by the block given reference numerals 210 and 212 in FIG. 9. The next ripple field in the ripple chain is extracted from the ripple chain identifier or RIPFID in the storage template 42 for that UPDATE RECORD data base message 54, as represented by the block given reference numeral 214 in FIG. 9, and the old data is extracted from that next ripple field in the ripple chain, with the data extracted from the previous FID or ripple field in the ripple chain then being inserted in this ripple field. These functions are represented by the blocks given reference numerals 216 and 218 in FIG. 9. A determination is then made as to whether or not the RIPFID is now 0, which would indicate the end of the ripple chain. This is reprented by the block given reference numeral 220 in FIG. 9. If it is not 0, then the ripple processing preferably moves to the next FID in the ripple chain, as represented by the block given reference numeral 222, and the processing preferably continues in the manner previously described. If, however, the RIPFID is 0, then this is an indication that the ripple chain processing has been completed. It should be noted that the ripple fields in a ripple chain do not have to be in field sequence, but merely need be a different field so that the ripple chain could be field 1, field 2, field 6, and then field 4, for example, or field 1, 2, 3 and 4. Although the ripple chain effect has been generally discussed above, we shall discuss it further with respect to the illustration of FIG. 10, assuming that the ripple chain consists of four fields, FID 1, FID 2, FID 3 and FID 4, with the data information content of these fields being represented by the letters A, B, C, D and E and, for purpose of illustration, with the RIPFID identifiers in the ripple chain being represented by the numbers 2, 3, and 4, referring to FID 2, FID 3, and FID 4, respectively, and by the identifier 0 which, as previously described, indicates the end of the ripple chain.

In the example of FIG. 10, the new data for FID 1, which is the FID indicated in the UPDATE RECORD data base message 54 in this example, is designated by the letter E. The old data information content of FID 1, which is designated by the letter A, is first extracted from FID 1 and, then, information E is inserted in its place. The RIPFID associated with FID 1 is then extracted from the RIPFID field, with this RIPFID pointing to FID 2. The old information content of FID 2, represented by the letter B, is then extracted from FID 2 and the information content A previously extracted from FID 1 is inserted in its place. The RIPFID associated with FID 2 is then extracted and, in the above example, points to FID 3. The old data content of FID 3, represented by letter C, is extracted from FID 3 and the previous information content of FID 2 represented by letter B, is inserted in its place. The RIPFID associated with FID 3 is then extracted and it points to FID 4. The old data content of FID 4, represented by the letter D, is extracted and the previous information content of FID 3, represented by letter C, is inserted in its place. The RIPFID associated with FID 4 is then extracted. Since in the above example it is a 0, this indicates the end of the ripple chain and the ripple processing is terminated. Since the old information D extracted from FID 4 is no longer to be used, in the above example, it is dropped. Thus, in order to process a ripple chain, all that the local receiver data base 24 need be sent, in the above example, is the new data for FID 1, such as the last trade price, and the associated storage template 42 for that RIC, contains the information which causes the processing of the ripple chain to occur, resulting in the updating of data in each of the other ripple fields of the ripple chain which are FID 2, FID 3, and FID 4 in the above example of FIG. 10.

"TRANSFER OF DATA FROM AN UPDATE MESSAGE"

Figure 11:
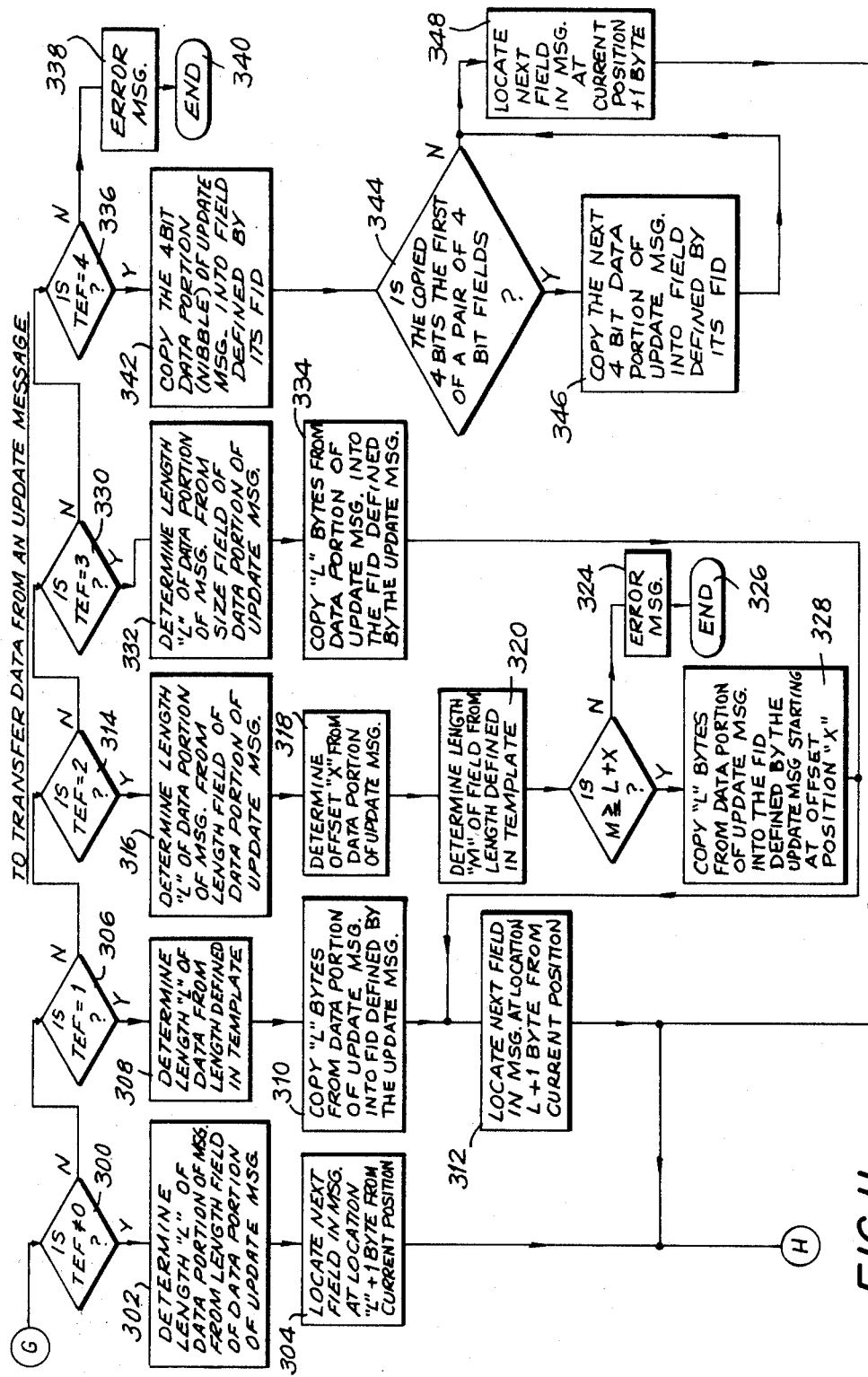
FIG. 11 is a logic flow diagram of the presently preferred method and system of FIG. 1 illustrating the transfer of data from an update message in the local receiver data base.

Referring now to FIG. 11, the actual transfer of the data information content of an UPDATE RECORD data base message 54 shall be described. As was previously mentioned with reference to FIG. 6B, the transmission encoding format or TEF associated with a given field identifier or FID can be different, with five such possibilities from TEF=0 to TEF=4, being illustrated in FIG. 11. With respect to the condition when TEF=0, in the example of FIG. 11, this is assumed to be a transient field and you must therefore locate the next field in the message by using the length defined in the data portion of the message with the data associated with this transmission encoding format not being applied to the data base since it is a non-data base type of message. The presently preferred steps to be employed under this condition are illustrated in FIG. 11 by the blocks given reference numerals 300, 302, and 304, with reference numeral 300 referring to the determination of the TEF as being 0, and with reference numeral 302 referring to the subsequent determination of the length "L" of the data portion of the UPDATE RECORD data base message from the length field of the data portion of the update message, and with reference numeral 304 referring to the location of the next field in the message at a location of the determined length "L" plus one byte from the current position. As shown in FIG. 6B, after this position has been determined, the data is transferred from the UPDATE RECORD data base message to modify the old data in that field of the record at the determined position, as indicated by the block given reference numeral 168.

If the TEF is not equal to 0, then a determination is made as to if the TEF is equal to 1 as represented by the block given reference numeral 306 in FIG. 11. Assuming that the TEF is equal to 1, then the length "L" of the data is determined from the length defined in the associated storage template 42 for that record 40 or RIC, as represented by the block given reference numeral 308 in FIG. 11. Based on this determination, "L" bytes are copied from the data portion of the UPDATE RECORD data base message 54 into the field or FID defined by the UPDATE RECORD data base message 54, as represented by the block given reference numeral 310. The next field in the message is then located at a position which is L+1 byte from the current position, as represented by the block given reference numeral 312 in FIG. 11 and the data is then transferred from the UPDATE RECORD data base message to modify the old data in that field of the record at the determined position.

Figure 12:
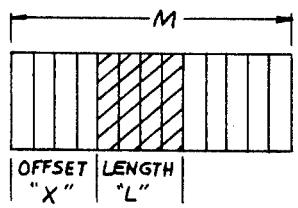
FIG. 12 is a diagrammatic illustration of a typical update message from which data is transferred in accordance with FIG. 11.

If the TEF is not equal 1, however, then a determination is made as to whether the TEF is equal to 2, as represented by the block given reference numeral 314 in FIG. 11. If the TEF is equal to 2, then the length "L" of the data portion of the message is determined from the length field of the data portion of the UPDATE RECORD data base message, as represented by the block given reference numeral 316. An offset X is then determined from the data portion of the UPDATE RECORD data base message, as represented by the block given reference numeral 318, with the offset X being illustrated in FIG. 12. The length "M" of the field is then determined from the length defined in the storage template 42 associated with the RIC of the UPDATE RECORD data base message, as represented by the block given reference numeral 320. A determination is then made as to whether this length "M" of the field is greater than or equal to length "L" of the data portion of the message plus the offset, as represented by the block given reference numeral 322. If it is not, an error message is generated, as represented by the block given reference numeral 324, and the processing is terminated, as represented by the block given reference numeral 326. If, however, this relationship is satified, then "L" bytes are copied from the data portion of the UPDATE RECORD data base message 54 into the field or FID defined by the UPDATE RECORD data base message 54 starting at offset position "X". Again, this relationship is illustrated in FIG. 12, with this function being represented by the block given reference numeral 328 in FIG. 11. After this has been accomplished, the next field in the message is located at location L+1 byte from the current position and the transfer of data from the UPDATE RECORD data base message to modify the old data in that field of the record occurs.

If, however, the TEF is not equal to 2, then a determination is made as to whether the TEF is equal to 3, as represented by reference numeral 330 in FIG. 11. Assuming the TEF is equal to 3, the length "L" of the data portion of the message is determined from the size field of the data portion of the UPDATE RECORD data base message 54, as represented by the block given reference numeral 332 in FIG. 11. Thereafter, "L" bytes are copied from the data portion of the UPDATE RECORD data base message into the field or FID defined by the data base message 54, as represented by the block given reference numeral 334, and the next field in the message is located at location L+1 byte from the current position. The data is then transferred from the UPDATE RECORD data base message to modify the old data in that field of the record.

Lastly, in the above example, if the TEF is not equal to 3, then a determination is made as to whether the TEF is equal to 4, as represented by the block given reference numeral 336. If it is not equal to 4, in the above example, then an error message is generated, as represented by the block given reference numeral 338, and the processing is terminated, as represented by the block given reference numeral 340. If, however, the TEF is equal to 4, this is indicative of the transmission of nibbles which are 4 bit data portions equal to half of a byte, with two nibbles being equal to a full byte. In such an instance, the four bit data portion or nibble of the UPDATE RECORD data base message 54 is copied into the field defined by the FID associated with this nibble, as represented by the block given reference numeral 342. A determination is then made as to whether the copied 4 bits are the first of a pair of 4 bit fields, as represented by the block given reference numeral 344. If it is the first four bits of a pair of four bit fields, then the next four bit data portion of the UPDATE RECORD data base message 54 is copied into the field defined by its FID as represented by the block given reference numeral 346, and the next field in the message is located at the current position plus one byte, as represented by the block given reference numeral 348, and data is transferred from the UPDATE RECORD data base message to modify old data in that field of the record at that position. Similarly, if the copied four bits are not the first of a pair of four bit fields, then a next step is to locate then the next field of the message at the current position plus one byte, as represented by the block given reference numeral 348, and to transfer data from the UPDATE RECORD data base message to modify old data in that field of the record at that position.

The above processing described with reference to FIG. 11 can further be described in terms of a programming format information which can readily be converted into PASCAL for running on the Digital Equipment Corporation MICROVAX computer by way of example. Table H below illustrates this programming information format:

TABLE H

```
PROCESS_MSG_FDAT (FID, FDAT_index, FDAT_SIZE)
begin
        TEF : = TEMPLATES [M_C_B.TPLNO].DATA [FID].TEF
        DIF : = TEMPLATES [M_C_B.TPLNO].DATA [FID].DIF
        FLDLEN : = TEMPLATES [M_C_B.TPLNO].DATA [FID].FLDLEN
        OFFSET : = TEMPLATES [M_C_B.TPLNO].DATA [FID].OFFSET
        RIPFID : = TEMPLATES [M_C_B.TPLNO].DATA [FID].RIPFID
    if (OFFSET = 0)
    then
        REPORT_WARNING (FID IN MESSAGE NOT DEFINED IN TEMPLATE)
        UPDATE_STATS
        ABORT_MSG : = TRUE
    else
        if (FLDLEN = 0)
        then
            REPORT_ERROR (FID NOT DEFINED IN TEMPLATE)
            UPDATE_STATS
            ABORT_MSG : = TRUE
        else
            case TEF of
                TEF = 0 :
                    STATUS : = PROCESS_TEF0_FDAT
                TEF = 1 :
                    STATUS : = PROCESS_TEF1_FDAT
                TEF = 2 :
                    STATUS : = PROCESS_TEF2_FDAT
                TEF = 3 :
                    STATUS : = PROCESS_TEF3_FDAT
                TEF = 4 :
                    STATUS : = PROCESS_TEF4_FDAT
            endcase
        endif
    endif
end.PROCESS_TEF0_FDAT
begin
        FDAT_SIZE : = MS_MSG [FDAT_INDEX]
        if (FDAT_INDEX + FDAT_SIZE.GT.(MSG_SIZE + 1)
        then
            PROCESS_TEF0_FDAT : = MSG_FDAT_OVERRUN
            ERROR_CODE : = FDAT_OVERRUN
            REPORT_ERROR (FDAT EXCEEDS LENGTH OF MESSAGE)
        else
        endif
end.
PROCESS_TEF1_FDAT
begin
        FDAT_SIZE : = FLDLEN
        if (FDAT_SIZE + FDAT_INDEX).GT.(MSG_SIZE + 1)
        then
            REPORT_ERROR (FIELD DATA EXTENDS BEYOND END OF MESSAGE)
            UPDATE_STATS
            PROCESS_TEF1_FDAT : = ABORT_MSG
        else
            MOVE_DATA (MS_MSG [FDAT_INDEX],
                        RECORD.DATA [OFFSET - 3],
                        FDAT_SIZE)
            PROCESS_TEF1_FDAT : = NO_ERROR
        endif
end.
PROCESS_TEF2_FDAT
begin
        FDAT_START : = MS_MSG [FDAT_INDEX]
        FDAT-SIZE : = MS_MSG [FDAT_INDEX + 1]
        if (FDAT_START + FDAT_SIZE.GT.TEMPLATE (FID).FLDLEN)
        then
            REPORT_ERROR ("out of field boundary")
            EXIT
        else
```

TABLE H-continued

```
end
PROCESS_TEF3_FDAT
begin
      FDAT_SIZE : = MS_MSG [FDAT_INDEX AND OCT 3] + 2
      MOVE_DATA (MS_MSG [FDAT_INDEX + 2),
          RECORD.DATA [OFFSET - 3 + FDAT_START],
          FDAT_SIZE)
end
PROCESS_TEF4_FDAT
begin
      MOVE_DATA (MS_MSG [FDAT.INDEX],
                  RECORD.DATA [OFFSET - 3],
      If PROCESSING_SID = TRUE AND NEXT_FID = FDAT_4
      then
          SWAP_NIBBLE (MS_MS4 [FDAT.INDEX])
          MOVE_DATA (MS_MS4 [FDAT.INDEX],
                  RECORD.DATA [OFFSET - 3],
                  1)
      end
end
```

Briefly summarizing the above method and system of the present invention, through use of storage templates which allow integral record by record treatment of a local receiver data base in an information retrieval communication network, and the use of set identifiers and ripple chains which allow a compression of the information required to be transmitted in a dynamic update environment, an efficient data delivery system both from a bandwidth an operational point of view, may be provided,

What is claimed is:

1. A method for dynamically controlling a stored record content of a local receiver data base from a transmitter data base in an information retrieval communication network in which a message transmitter means transmitting said transmitter data base dynamically provides data base messages over a message distribution network to a message receiver means receiving said local receiver data base, said method comprising the steps of distributing a plurality of said data base messages to said message receiver means from said transmitter data base as self contained integral records; locally deciphering said distributed data base messages at said message receiver means for controlling said local receiver data base stored record content, said local deciphering step comprising the step of locally retrievably storing a plurality of different storage templates in said local receiver data base, each of said storage templates defining a different unique logical data structure for said distributed self contained integral records, at least one of said stored storage templates corresponding to a plurality of said distributed self contained integral records, each of said plurality of distributed data base messages comprising a storage template identifier corresponding to a given one of said storage templates, said storage template corresponding to a given one of said distributed self contained integral records being locally retrieved based on said storage template identifier content of said given one of said distributed self contained integral records; and processing said given one of said distributed self contained integral records at said message receiver means for controlling said local receiver data base stored record content with respect to said given one of said distributed self contained integral records based on said locally retrieved corresponding storage template.

2. A method in accordance with claim 1 wherein said processing step comprises the step of adding said given one of said distributed self contained integral records to said local receiver data base as a stored record for incrementally increasing the stored record content of said local receiver data base.

3. A method in accordance with claim 2 wherein said adding step further comprises the step of locally retrievably storing said given one of said distributed self contained integral records in said local receiver data base, said local receiver data base storing a plurality of said distributed data base message integral records, each of said distributed stored integral records in said local receiver data base having a corresponding storage template.

4. A method in accordance with claim 1 wherein said local receiver data base stores a plurality of said distributed data base message integral records, each of said distributed stored integral records in said local receiver data base having a corresponding storage template, said distributed data base messages further comprising a drop record message corresponding to a given one of said distributed stored records, said processing step further comprising the step of dropping said given one of said distributed stored records from said local receiver data base for incrementally decreasing the stored record content of said local receiver data base.

5. A method in accordance with claim 1 further comprising the step of locally retrievably storing a plurality of said distributed self contained integral records in said local receiver data base, each of said distributed stored integral records in said local receiver data base having a corresponding storage template.

6. A method in accordance with claim 5 wherein said distributed data base messages comprise an update message for updating the stored record content of a given one of said locally stored distributed self contained integral records in said local receiver data base, said update message comprising a unique record identifier corresponding to said given one of said locally stored distributed self contained integral records, said given one of said locally stored distributed self contained integral records comprising an information content and said corresponding storage template identifier, said update message comprising an information content for updating said information content of said given one of said locally stored distributed self contained integral records, said local deciphering step comprising the step of deciphering said update message based on said retrieved corresponding storage template.

7. A method in accordance with claim 6 wherein said processing step comprises the steps of locally retrieving said given one of said locally stored distributed self contained integral records and updating said information content of said given one of said locally stored distributed self contained integral records based on said update message information content.

8. A method in accordance with claim 7 wherein said given one of said locally stored distributed self contained integral records comprises a plurality of different information fields, each of said information fields having a corresponding information content, said update message further comprising a field identifier corresponding to each of said information field contents to be updated, said processing step further comprising the step of updating said given one of said locally stored distributed self contained integral records based on said update message field identifier.

9. A method in accordance with claim 8 wherein said retrieved corresponding storage template for said update message comprises a ripple chain, said ripple chain chaining together a plurality of said information fields in said given one of said locally stored distributed self contained integral records for enabling updating of each of said plurality of chained information fields in said ripple chain, said processing step further comprising the step of updating the information content of each of said chained information fields in said ripple chain in response to a single information field content in said distributed update message.

10. A method in accordance with claim 9 wherein the step of distributing data base message comprises the step of distributing financial information data base messages, said information fields of said given one of said locally stored distributed locally stored distributed self contained integral records comprising financial information, said ripple chain of said retrieved associated storage template for said update message relating to chronologically changing financial information, said plurality of chained information fields being chronologically related and corresponding to a common information category.

11. A method in accordance with claim 5 wherein said distributed data base messages comprise an update message for updating the stored record content of a given one of said locally stored distributed self contained integral records in said local receiver data base, said update message comprising an update of an information content, said given one of said locally stored distributed self contained integral records comprises a plurality of different information fields, each of said information fields having a corresponding information content, said retrieved associated storage template for said update message comprises a ripple chain, said ripple chain chaining together a plurality of said information fields in said given one of said locally stored distributed self contained integral records for enabling updating of each of said plurality of chained information fields in said ripple chain, said processing step further comprising the step of updating the information content of each of said chained information fields in said ripple chain in response to a single information field content in said distributed update message.

12. A method in accordance with claim 11 wherein the step of distributing data base messages comprises the step of distributing financial information data base messages, said information fields of said given one of said locally stored distributed self contained integral records comprising financial information, said ripple chain of said retrieved corresponding storage template for said update message relating to chronologically changing financial information, said plurality of chained information fields being chronologically related and corresponding to a common information category.

13. A method in accordance with claim 11 wherein said update message further comprises a field identifier, said update message field identifier comprises a set identifier corresponding to a plurality of different information fields, each of said different information fields corresponding to a different information category, said processing step further comprising the step of updating each of said plurality of different information fields of said given one of said locally stored distributed self contained integral records based on said single update message.

14. A method in accordance with claim 8 wherein said update message field identifier comprises a set identifier corresponding to a plurality of different information fields, each of said different information fields corresponding to a different information category, said processing step further comprising the step of updating each of said plurality of different information fields of said given one of said locally stored distributed self contained integral records based on said single update message.

15. In an information retrieval communication system comprising a message transmitter means for dynamically providing data base messages, message receiver means for receiving said dynamically provided data base messages, and a message distribution network operatively connected between said message transmitter means and said message receiver means for distributing said data base messages from said message transmitter means to said message receiver means, said message transmitter means comprising data base storage means for remotely dynamically storing said data base messages in a transmitter data base, and said message receiver means comprising local data base storage means for storing a local receiver data base, the improvement comprising means for transmitting a plurality of said data base messages as self contained integral records, said self contained integral records comprising an information content, said message transmitter means comprising said self contained integral record transmitting means; and means for local retrievably integrally storing each of said transmitted integral records in said local data base storage means for providing said local receiver data base, said message receiver means comprising said integral record storage means, said integral record storage means comprising a plurality of different storage template means defining a different unique logical data structure for said records in said local receiver data base storage means, at least one of said storage template means being corresponding to a plurality of said stored records in said local receiver data base storage means, each of said stored records in said local receiver data base storage means having a corresponding storage template means, each of said transmitted self contained integral records comprising a storage template means identifier corresponding to a given one of said storage template means, said message receiver means further comprising means for retrieving said storage template means corresponding to said transmitted storage template means identifier, each of said storage template means comprising means for uniquely deciphering a transmitted self contained integral record for enabling complete processing thereof by said message receiver means based on said retrieved storage template means; whereby a communication network dynamic local data base management system is provided.

16. An improved system in accordance with claim 15 wherein a plurality of said storage template means are each corresponding to a different plurality of said stored records in said local receiver data base.

17. An improved system in accordance with claim 15 wherein said message transmitter means further comprises means for transmitting non-data base messages to said message receiver means in addition to said data base messages, said non-data base messages comprising a displayable data content for said message receiver means, said non-data base messages not being stored in said local data base storage means, said message receiver means further comprising display means capable of providing a displayable data output based on said displayable data content of said non-data base messages.

18. An improved system in accordance with claim 15 wherein said message receiver means comprises a plurality of receivers each comprising its own corresponding local data base storage means and integral record storing means for locally retrievably storing said transmitted integral records in said corresponding local data base storage means for providing its own local receiver data base, and its own storage template retrieving means for enabling said complete processing of said locally stored transmitted integral records by said receiver based on said locally stored storage template means.

19. An improved system in accordance with claim 18 wherein at least two of said local receiver data bases have a different stored integral record content.

20. An improved system in accordance with claim 15 wherein said transmitted data base messages comprise a transmitted add template message, said add template message comprising a unique one of said storage template means absent from said local receiver data base, said local data base storage means locally storing said transmitted absent storage template means for enabling subsequent deciphering and complete processing of said transmitted self-contained integral records having a storage template means identifier corresonding to said locally stored transmitted absent storage template means.

21. An improved system in accordance with claim 15 wherein said local receiver data base comprises a subset of said transmitter data base, said local receiver data base being defined by said transmitted data base messages.

22. An improved system in accordance with claim 15 wherein said self-contained integral record transmitting means comprises means for incrementally increasing the content of said local receiver data base on a record-by-record basis.

23. An improved system in accordance with claim 22 wherein said local receiver data base comprises a subset of said transmitter data base, said local receiver data base being defined by said transmitted data base messages.

24. An improved system in accordance with claims 15 wherein said self-contained integral records are independent records, each independent record having a unique record identifier.

25. An improved systems in accordance with claim 24 wherein said independent records further comprise a set of fields.

26. An improved system in accordance with claim 15 wherein each of said records has a corresponding characteristic logical structure, said storage template means defining said characteristic logical record structure, said logical record structure comprising means for defining how a given record shall be interpreted and processed.

27. An improved system in accordance with claim 26 wherein said self-contained integral records are independent records, each independent record having a unique record identifier.

28. An improved system in accordance with claim 27 wherein said independent records further comprise a set of fields.

29. An improved system in accordance with claim 15 wherein said transmitted data base messages comprise financial information.

30. An improved system in accordance with claim 15 wherein said transmitted data base messages comprise an update message for updating the information content of a locally stored previously transmitted integral record in said local receiver data base, said update message comprising a unique record identifier corresponding to said locally stored previously transmitted integral record, said locally stored previously transmitted integral record comprising an information content and said corresponding storage template means identifier, said receiver storage template retrieving means retrieving the storage template means corresponding to said update message from said local receiver data base based on said locally stored previously transmitted integral record, said update message being deciphered based on said retrieved corresponding storage template means.

31. An improved system in accordance with claim 30 wherein said locally stored previously transmitted integral record comprises a plurality of different information fields, each of said fields having a corresponding information category, said update message further comprising a field identifier corresponding to each of said information fields to be updated for enabling selective update of said locally stored previously transmitted integral record based on said update message field identifier, said receiver means integral storage means comprising means for selectively updating said locally stored previously transmitted integral record based on said update message field identifier.

32. An improved system in accordance with claim 31 wherein said update message locally stored corresponding storage template means comprises a ripple chain, said ripple chain chaining together a plurality of said information fields in said locally stored previously transmitted integral record for enabling updating of each said plurality of chained information fields in said ripple chain in response to a single transmitted update in only one of said plurality of chained information fields in said transmitted update message; whereby communications capacity that is required between transmitter and receiver is reduced, resulting in enhancement to transmission bandwidth efficiency.

33. An improved system in accordance with claim 32 wherein said transmitted data base messages and said transmitted update message comprises financial information, said ripple chain relating to chronologically changing financial information, said plurality of chained information fields being chronologically related and corresponding to the same information category.

34. An improved system in accordance with claim 30 wherein said message receiver means comprises a plurality of receivers each comprising its own corresponding local data base storage means and integral record storing means for locally retrievably storing said transmitted integral records in said corresponding local data base storage means for providing its own local receiver data base, and its own storage template retrieving means for enabling said complete processing of said locally storage transmitted integral records by said receiver based on said locally stored storage template means.

35. An improved system in accordance with claim 31 wherein said update message field identifier comprises a set identifier corresponding to a plurality of different information fields, each of the different information fields corresponding to a different information category, each of said plurality of different information fields being updated based on said single update message; whereby communications capacity that is required between transmitter and receiver is reduced, resulting in enhancement to transmission bandwidth efficiency.

36. An improved system in accordance with claim 35 wherein said transmitted data base messages and said transmitted update message comprises financial information.

37. An improved system in accordance with claim 36 wherein said different information fields of financial information are related such that changes to these fields commonly occur contemporaneously.

38. An improved system in accordance with claim 31 wherein said local receiver data base stores a plurality of said distributed data base message integral records, each of said distributed stored integral records in said local receiver data base having a corresponding storage template, said distributed data base messages further comprising a drop record message corresponding to a given one of said distriuted stored records, said receiver means further comprising means for dropping said given one of said distributed stored records from said local receiver data base in response to said drop record message for incrementally decreasing the stored record content of said local receiver data base.

39. An improved system in accordance with claim 38 wherein said update message field identifier comprises a set identifier corresponding to a plurality of different information fields, each of the different information fields corresponding to a different information category, each of said plurality of different information fields being updated based on said single update message; whereby communications capacity that is required between transmitter and receiver is reduced, resulting in an enhancement to transmission bandwidth efficiency.

40. An improved system in accordance with claim 39 wherein said transmitted data base messages and said transmitted update message comprises financial information.

41. An improved system in accordance with claim 40 wherein said different information fields of financial information are related such that changes to these fields commonly occur contemporaneously.

42. An improved system in accordance with claim 32 wherein said message receiver means comprises a plurality of receivers each comprising its own corresponding local data base storage means and integral record storing means for locally retrievably storing said transmitted integral records in said corresponding local data base storage means for providing its own local receiver data base, and its own storage template retrieving means for enabling said complete processing of said locally stored transmitted integral records by said receiver based on said locally stored storage template means.

43. An improved system in accordance with claim 42 wherein said transmitted data base messages and said transmitted update message comprises financial information, said ripple chain relating to chronologically changing financial information, said plurality of chained information fields being chronologically related and corresponding to the same information category.

44. An improved system in accordance with claim 15 wherein said transmitted data base messages comprise an update message for updating the information content of a locally stored previously transmitted integral record in said local receiver data base, said update message comprising a unique record identifier corresponding to said locally stored previously transmitted integral record, said locally stored previously transmitted integral record comprising an information category, said receiver means comprising means for updating said locally stored previously transmitted integral record information content based on said transmitted update message.

45. An improved system in accordance with claim 44 wherein said locally stored previously transmitted integral record comprises a plurality of different information fields, each of said fields having a corresponding information category, said update message further comprising a field identifier associated with each of said information fields to be updated for enabling selective update of said locally stored previously transmitted integral record based on said update message field identifier, said receiver means integral storing means comprising means for selectively updating said locally stored previously transmitted integral record based on said update message field identifier.

46. An improved system in accordance with claim 45 wherein said plurality of locally stored storage template means comprises a storage template means corresponding to said update message and said locally stored previously transmitted integral record, said update message locally stored corresponding template means comprising a ripple chain, said ripple chain chaining together a plurality of said information fields in said locally stored previously transmitted integral record for enabling updating of each of said plurality of chained information fields in said ripple chain in response to a single transmitted update in only one of said plurality of chained information fields in said transmitted update message; whereby communications capacity that is required between transmitter and receiver is reduced, resulting in enhancement to transmission bandwidth efficiency.

47. An improved system in accordance with claim 46 wherein said transmitted data base messages and said transmitted update message comprises financial information, said ripple chain relating to chronologically changing financial information, said plurality of chained information fields being chronologically related and corresponding to the same inforamtion category.

48. An improved system in accordance with claim 44 wherein said update message field identifier comprises a set identifier corresponding to a plurality of different information fields, each of the differnet information fields corresponding to a different information category, each of said plurality of different information fields being update based on said single update message; whereby communications capacity that is required between transmitter and receiver is reduced, resulting in enhancement to transmission bandwidth efficiency.

49. An improved system in accordance with claim 48 wherein said transmitted data base messages and said transmitted update message comprises financial information.

50. An improved system in accordance with claim 49 wherein said different information fields of financial information are related such that changes to these fields commonly occur contemporaneously.

51. An improved system in accordance with claim 44 wherein said message receiver means comprises a plurality of receivers each comprising its own corresponding local data base storage means and integral record storing means for locally retrievably storing said transmitted integral records in said corresponding local data base storage means for providing its own local receiver data base, and its own storage template retrieving means for enabling said complete processing of said locally stored transmitted integral records by said receiver based on said locally stored storage template means.

52. An improved system in accordance with claim 51 wherein said locally stored previously transmitted integral record comprises a plurality of different information fields, each of said fields having a corresponding information category, said update message further comprising a field identifier corresponding to each of said information fields to be updated for enabling selective update of said locally stored previously transmitted integral record based on said update message field identifier, said receiver means integral storing means comprising means for selectively updating said locally stored previously transmitted integral record based on said update message field identifier.

53. An improved system in accordance with claim 52 wherein said plurality of locally stored storage template means comprises a stored template means corresponding to said update messsage and said locally stored previously transmitted integral record, said update message locally stored corresponding template means comprising a ripple chain, said ripple chain chaining together a plurality of said information fields in said locally stored previously transmitted integral record for enabling updating of each of said plurality of chained information fields in said ripple chain in response to a single transmitted update in only one of said plurality of chained information fields in said transmitted update message; whereby communications capacity that is required between transmitter and receiver is reduced, resulting in enhancement to transmission bandwidth efficiency.

54. An improved system in accordance with claim 53 wherein said transmitted data base messages and said transmitted update message comprises financial information, said ripple chain relating to chronologically changing financial information, said plurality of chained information fields being chronologically related and corresponding to the same information category.

55. An improved system in accordance with claim 51 wherein said update message field identifier comprises a set identifier corresponding to a plurality of different information fields, each of the different information fields corresponding to a different information category, each of said plurality of different information fields being updated based on said single update message; whereby communications capacity that is required between transmitter and receiver is reduced, resulting in enhancement to transmission bandwidth efficiency.

56. An improved system in accordance with claim 55 wherein said transmitted data base messages and said transmitted update message comprises financial information.

57. An improved system in accordance with claim 56 wherein said different information fields of financial information are related such that changes to these fields commonly occur contemporaneously.

58. An improved system in accordance with claim 15 wherein said information content of said self-contained integral records comprises displayable data, said message receiver means further comprising display means capable of providing a displayable data output based on said displayable data information content of said data base messages received by said message receiver means.

59. An improved system in accordance with claim 58 wherein said message transmitter means further comprises means for transmitting non-data base messages to said message receiver means in addition to said data base messages, said non-data base messages comprising displayable data for said message receiver means, said non-data base messages not being stored in said local data base storage means, said display means further being capable of providing said displayable data output based on said displayable data content of said non-data base messages.

60. An improved system in accordance with claim 58 wherein said displayable data information content comprises financial information.

* * * * *